United States Patent
Uno et al.

[11] Patent Number: 6,018,435
[45] Date of Patent: Jan. 25, 2000

[54] DISK APPARATUS, AND RECORDING/REPRODUCTION METHOD THEREFOR

[75] Inventors: Hiroshi Uno; Tomohisa Oyama, both of Kawasaki, Japan

[73] Assignee: Fujitsu Limited, Kawasaki, Japan

[21] Appl. No.: 08/782,312

[22] Filed: Jan. 15, 1997

[30] Foreign Application Priority Data

Mar. 25, 1996 [JP] Japan ................................. 8-068831

[51] Int. Cl.[7] ........................... G11B 5/596; G11B 17/22
[52] U.S. Cl. ...................... 360/78.14; 369/32; 369/44.28
[58] Field of Search .................. 369/54, 58, 32, 369/33, 44.26, 44.27, 44.28, 44.32, 47, 48, 50; 360/72.2, 72.1, 78.04, 78.14, 75, 78.01

[56] References Cited

U.S. PATENT DOCUMENTS 4,890,299   12/1989   Dolivo et al. .

FOREIGN PATENT DOCUMENTS

| 61-099972 | 5/1986 | Japan . |
| 61-099973 | 5/1986 | Japan . |
| 63-157377 | 6/1988 | Japan . |
| 63-206958 | 8/1988 | Japan . |
| 3283055 | 12/1991 | Japan . |

*Primary Examiner*—Paul W. Huber
*Attorney, Agent, or Firm*—Greer, Burns & Crain, Ltd.

[57] ABSTRACT

A disk control section of a disk apparatus comprises an identification section for identifying information regarding a position at which head positioning servo information is stored. A position calculation unit calculates the position on a disk medium where recording/reproduction of record information is to be performed. A comparison and decision unit compares the information regarding the position identified by the identification unit with the position information calculated by the position calculation unit each time a predetermined command is received from a higher-level device, and for deciding whether or not the position identified by the identification unit is the position at which the record information is to be recorded on or reproduced. A skip recording/reproduction unit carries out control such that when it is judged, on the basis of the result of the comparison, that the position identified by the identification unit is the position at which recording/reproduction of the record information is to be performed, the record information is recorded/reproduced while skipping the position identified by the identification unit. Accordingly, it becomes possible to record and reproduce variable-length data even in a sector-servo type disk apparatus and a hybrid type disk apparatus, so that their storage capacities can be used effectively.

22 Claims, 20 Drawing Sheets

FIG. 13

| NAME | CODE | USE |
|---|---|---|
| SERVO AREA | 11001 | INDICATE SERVO AREA ON DATA PLANE |
| OUTER GUARD BAND 2 | 01110 | INDICATE OUTERMOST AREA |
| OUTER GUARD BAND 1 | 01010 | USE IN DETECTION OF 0 CYLINDER |
| INNER GUARD BAND | 10011 | INDICATE INNERMOST AREA |
| INDEX MARKER | 01011 | INDICATE START OF PHYSICAL TRACK |

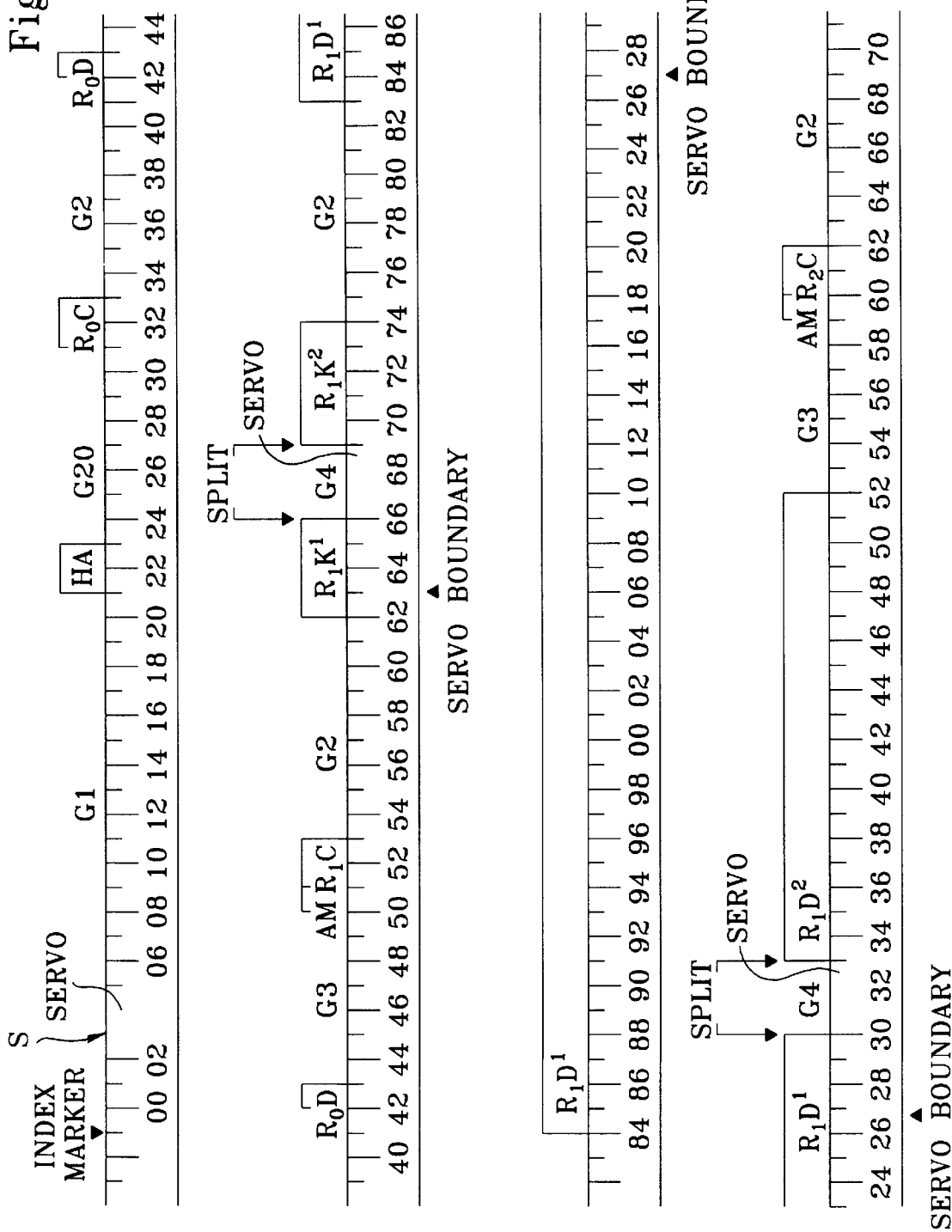

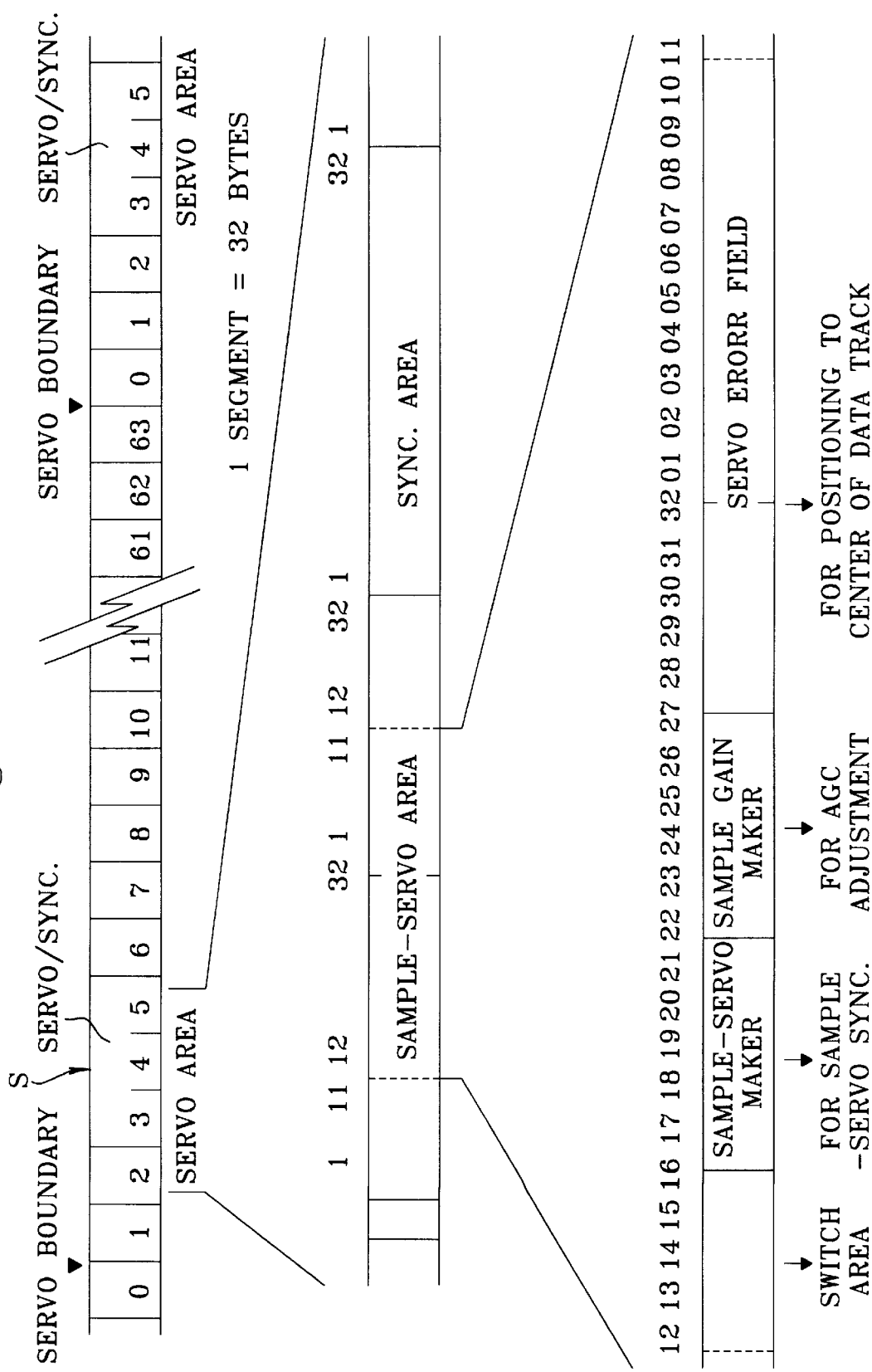

DISK APPARATUS, AND RECORDING/REPRODUCTION METHOD THEREFOR

BACKGROUND OF THE INVENTION (1) Field of the Invention

The present invention relates to a disk apparatus of a sector-servo type in which head positioning information is recorded on a data plane of a disk medium and, more particularly, to a disk apparatus capable of recording and reproducing variable-length data, as well as a recording/reproduction method therefor.

(2) Description of the Related Art

Disk apparatuses, such as magnetic disk apparatuses and optical disk apparatuses, are widely used as external storage devices for computer systems.

In a recent disk apparatus, a bit pitch in the circumferential direction of the disk medium and a track interval (or a track pitch) in the radial direction of the same have been made smaller in order to increase the recording density of the disk medium in an effort to satisfy a demand for an increased storage capacity.

In addition to a servo-plane-servo type disk apparatus and a sector-servo type (i.e., data-plane-servo type) disk apparatus, there exists a hybrid type disk apparatus.

In the servo-plane-servo type disk apparatus, servo information for use in positioning a head is recorded on a servo plane of a disk medium. A dedicated servo head is used to detect the servo information. A data head facing a data plane is subjected to position control on the basis of the thus-detected servo information. The data head records data on or reproduces data from the disk medium.

In the sector-servo type disk apparatus, the servo information is recorded on the data plane of the disk medium. This servo information is directly detected by use of the data head, and the positioning of the data head is controlled on the basis of the detected servo information. The data head records data on or reproduces data from the disk medium.

The hybrid type disk apparatus is a hybrid of a servo-plane-servo type disk apparatus and a sector-servo type disk apparatus. In the disk apparatus of this type, the servo information is recorded on both the servo plane and the data plane of the disk medium in a split manner. A dedicated servo head is used to detect the servo information recorded over the entire memory area on the servo plane. The positioning of the data head is roughly controlled on the basis of the thus-detected servo information. Subsequently, the servo information for on-track control purposes recorded on the data plane is directly detected by the data head. On-track control of the data head is carried out on the basis of the servo information detected from the data plane, whereby the data head records data on or reproduces data from the disk medium.

However, a thermal off-track problem sometimes arises in the servo-plane-servo type disk apparatus. More specifically, the data head fails to follow the track of the data plane even when the servo head properly follows the track of the servo plane. In such a case, the data head is positioned off the track center and, therefore, is unable to correctly record data on or reproduce data from the disk medium. For these reasons, it has been difficult to improve the recording density of the disk medium by reducing the track pitch.

In contrast, in the sector-servo type and hybrid type disk apparatuses, the data head can precisely position itself at the track center by virtue of the servo information recorded on the data plane. Even if the track pitch is reduced, it is possible for the data head to correctly record data on or reproduce data from the disk medium. In consequence, the recording density of the disk medium can be improved.

The disk medium is formatted in one of two ways; namely, a sector format and a count key data format (CKD format).

In the sector format, a record section comprises an address section (ID section) and a fixed-length data section. In contrast, in the CKD format, the record section comprises a count section, a variable-length key section (this key section is optional), and a variable-length data section.

In the sector format comprising the fixed-length data section, the servo information is recorded at predetermined intervals to be located at the boundary of each record section (i.e., a sector). For this reason, it is possible to identify the position of the recorded servo information. Therefore, the sector-servo type and hybrid type disk apparatuses can carry out the recording/reproduction of data having a fixed-length form while avoiding the servo area on the data plane where the servo information is recorded.

In the case of the CKD format comprising the previously described variable-length data section and key section, the position in each record section of the track on the data plane where the servo information is to be recorded is indefinite. Therefore, it is difficult to identify the position at which the servo information is recorded. In such a case, when variable-length data are recorded or reproduced, it is impossible to avoid the servo area where the servo information is recorded. In other words, the CKD format cannot be applied to the sector-servo type and hybrid type disk apparatuses.

In consideration of the length of the data actually produced by the sector-servo type and hybrid type disk apparatuses, it is desirable for the sector-servo type and hybrid type disk apparatuses to employ the CKD format that deals with variable-length data, as this would save the storage capacity of the disk apparatus.

For this reason, there has already been in actual use a disk apparatus that records or reproduces data by converting the sector format, which is a fixed-length data format, into the CKD format, which is a variable-length data format.

Even in this type of disk apparatus, variable-length data are recorded across a plurality of sectors after having been divided into data having a fixed length. Depending on the length of variable-length data, an unused area may frequently remain in the last sector at which the data are recorded. Because of this, the storage capacity of the disk apparatus cannot be effectively used.

In the sector-servo type and hybrid type disk apparatuses having a plurality of disk mediums, when data are recorded on or reproduced from the track of another disk medium after data have been recorded on or reproduced from the track of one disk medium, heads are switched (i.e., a head switching operation is carried out) so that the data can be recorded/reproduced using the head that corresponds to each disk medium.

In some of the previously described disk apparatus, the head is correctly positioned at the track center at the time of the head switching operation, through correction of the thermal off-track, which has been previously measured. Subsequently, a home address (HA), which designates a track address, is read.

However, the starting position of the track of each disk medium is provided at the same location in such a disk apparatus. Therefore, if the amount of correction of the off-track of the head becomes large after the head switching operation, it becomes impossible to complete the correction of the off-track of the head before the reading of the home address (HA) is started. As a result, it may sometimes be impossible to correctly read the home address (HA).

In this case, the home address (HA) will be read again after the disk medium has fully rotated once. Accordingly, it takes much time to record/reproduce the data after the head switching operation, and this considerably impairs the performance of the disk apparatus.

SUMMARY OF THE INVENTION

The present invention has been conceived in view of the previously described drawbacks. An object of the present invention is to provide a disk apparatus that has servo information recorded on a data plane like in a sector-servo type disk apparatus and a hybrid type disk apparatus, and that is arranged to effectively utilize the storage capacity thereof by use of a CKD format for handling variable-length data. Another object of the present invention is to provide a recording/reproduction method for use in this disk apparatus.

Still another object of the present invention is to provide a sector-servo type/hybrid type disk apparatus which is arranged to record/reproduce data at high speed without waiting for one rotation of a disk medium after a head switching operation. Yet another object of the present invention is to provide a recording/reproduction method for use in this sector-servo type/hybrid type disk apparatus.

To these ends, according to one aspect of the present invention, there is provided a disk apparatus including a disk medium that has a data plane for storing head positioning servo information and record information; a disk drive that drives the disk medium and records the information on or reproduces the information from the disk medium via the head; and a disk control section for controlling the disk drive in accordance with the instructions received from a higher-level device. The disk control section comprises an identification section for identifying information regarding the position on the disk medium at which the head positioning servo information is stored, a position calculation section for calculating the position on the disk medium where recording/reproduction of the record information is to be performed, a comparison and decision section for comparing the information regarding the position identified by the identification section with the position information calculated by the position calculation section each time a predetermined command is received from the higher-level device, and for deciding whether or not the position identified by the identification section is the position at which the record information is to be recorded on or reproduced, and a skip recording/reproduction section for carrying out a control operation such that when it is judged, on the basis of the result of the comparison made by the comparison and decision section, that the position of the servo information identified by the identification section is adjacent the position at which recording/reproduction of the related record information is to be performed, the record information is recorded/reproduced while skipping the servo information in the position identified by the identification section.

In the disk apparatus of the present invention, it becomes possible to record/reproduce data while avoiding the head positioning servo information, which in turn makes it possible for even the sector-servo type disk apparatus to use the CKD format that deals with the variable-length data. Eventually, the storage capacity of the disk apparatus can be effectively utilized.

According to another aspect of the present invention, there is provided a disk apparatus including a disk medium that has a data plane for storing head positioning servo information and record information; a disk drive that drives the disk medium and records the information on or reproduces the information from the disk medium via the head; and a disk control section for controlling the disk drive in accordance with the instructions received from a higher-level device. The disk control section comprises an identification section for identifying information regarding the position on the disk medium at which the head positioning servo information is stored, a medium deficiency position identification section for identifying information regarding the position of a deficiency of the disk medium on the basis of the information recorded on the disk medium, a position calculation section for calculating the position on the disk medium where recording/reproduction of the record information is to be performed, a comparison and decision section for comparing the information regarding the position identified by the identification section or the medium deficiency position identification section with the position information calculated by the position calculation section each time a predetermined command is received from the higher-level device, and for deciding whether or not the position identified by the identification section or the medium deficiency position identification section is the position at which the record information is to be recorded on or reproduced, and a skip recording/reproduction control section for carrying out a control operation such that when it is judged, on the basis of the result of the comparison made by the comparison and decision section, that the position identified by the identification section or the medium deficiency position identification section is adjacent the position at which recording/reproduction of the related record information is to be performed, the record information is recorded/reproduced while skipping the servo information or medium deficiency information at the position identified by the identification section or the medium deficiency position identification section.

In the disk apparatus, it becomes possible to record/reproduce data while avoiding the head positioning servo information. Even if the disk medium has a deficient area, it becomes possible to record/reproduce the data while avoiding the deficient area of the medium, as is done in a general disk apparatus. As a result, it is possible for even the sector-servo type disk apparatus to use the CKD format that deals with variable-length data. Eventually, the storage capacity of the disk apparatus can be effectively utilized.

According to still another aspect of the present invention, there is provided a disk apparatus including a disk medium that has a data plane for storing head positioning servo information and record information; a disk drive that drives the disk medium and records the information on or reproduces the information from the disk medium via the head; and a disk control section for controlling the disk drive in accordance with the instructions received from a higher-level device. The disk drive comprises a padding control section for controlling the erasure of a data, servo information position detection section for detecting information regarding the position on the disk medium at which the head positioning servo information is stored, and a padding prevention section for preventing the padding control section from controlling erasure of the position at which the head positioning information is stored, on the basis of the position information detected by the servo information position detection section.

By virtue of the disk apparatus of the present invention, the disk drive can perform a padding operation without receiving control of the disk control section, as is the case in the general disk apparatus, even when the sector-servo type disk apparatus uses the CKD format that deals with variable-length data.

According to yet another aspect of the present invention, there is provided a disk apparatus including a disk medium that has a plurality of data planes for storing head positioning servo information and record information, the record information including data information and count information regarding the length of the data information; a disk drive that drives the disk medium and records the information on or reproduces the information from the disk medium via the head; and a disk control section for controlling the disk drive in accordance with the instructions received from a higher-level device. The disk control section is provided with a seek control section that outputs to the disk drive the information for identifying a head to be subjected to a seek operation together with a seek command for controlling the disk drive so as to carry out the seek operation. The disk drive is provided with a seek operation section that carries out the seek operation upon receipt of the seek command and the head identification information from the seek control section.

In the disk apparatus of the present invention, it is possible to control the positioning of the head on the data plane at a higher speed.

According to a further aspect of the present invention, there is provided a disk apparatus including a disk medium which has a plurality of data planes for storing head positioning servo information and record information, wherein the information is recorded/reproduced by way of heads provided for the respective data planes of the disk medium. The disk apparatus comprises a head positioning/rotational position detection section which receives a rotational position detection command for controlling the head so as to detect a specified rotational position and information for identifying the head by which the rotational position is to be detected, and which positions the head and detects the specified rotational position.

In the above-described disk apparatus of the present invention, the head positioning/rotational position detection section enables quicker completion of the detection of the rotational position carried out in response to the rotational position detection command.

According to a still further aspect of the present invention, there is provided a disk apparatus including a disk medium that has a data plane for storing head positioning servo information and record information, wherein the information is recorded/reproduced by way of a head provided for the data plane. The disk medium has a structure in which the head positioning servo information is spaced a predetermined distance away from a track starting position.

In the disk apparatus of the present invention, it is possible to quickly record/reproduce data by rapidly completing the head positioning control after a head switching operation has been finished.

According to a yet further aspect of the present invention, there is provided a disk apparatus including a disk medium that has a plurality of data planes for storing head positioning servo information and record information, the record information including data information and count information regarding the length of the data information; wherein the information is recorded on or reproduced from the disk medium via heads provided for the respective data planes. The disk medium has a structure such that the starting positions of the plurality of data planes are delayed by predetermined distances corresponding to the respective data planes.

In the disk apparatus of the present invention, it is possible to quickly record/reproduce data by rapidly completing a head positioning control after a head switching operation has been finished.

According to a yet further aspect of the present invention, there is provided a disk apparatus which comprises a disk medium that has a data plane for storing head positioning servo information and record information including data information and count information regarding the length of the data information, a disk drive that records the information on or reproduces the information from the disk medium via the head, and a disk control section that controls the disk drive in accordance with instructions from a higher-level device.

In the disk apparatus of the present invention, it becomes possible for the sector-servo type disk apparatus to use the CKD format that deals with variable-length data.

According to a yet further aspect of the present invention, there is provided a recording/reproduction method for use in a disk apparatus that includes a disk medium having a plurality of data planes for storing head positioning servo information and record information; a disk drive that drives the disk medium and records the information on or reproduces the information from the disk medium via the head; and a disk control section for controlling the disk drive in accordance with the instructions received from a higher-level device. The method comprises the step of receiving a read control command or a write control command subsequent to a head switch command for carrying out switching among the heads such that one of the heads is selected, and notifying the disk control section of read/write enable/disenable information, based on the number of areas on the data plane, where the head positioning servo information is written, passed by the head.

In the recording/reproduction method of the present invention, it becomes possible to ensure the control of the reading/writing of data. If the read/write operations are enabled, it is possible to immediately read/write data, which in turn results in a an improvement of data read/write efficiency.

BRIEF DESCRIPTION OF THE DRAWINGS

FIG. 13 is a table which shows codes represented by the synchronization pulse in the embodiment of the present invention;

FIG. 15 is a diagram showing a servo area in the embodiment of the present invention;

DESCRIPTION OF THE PREFERRED EMBODIMENT (a) Aspects of the Present Invention

Aspects of the present invention will first be described with reference to the accompanying drawings.

Figure 1:
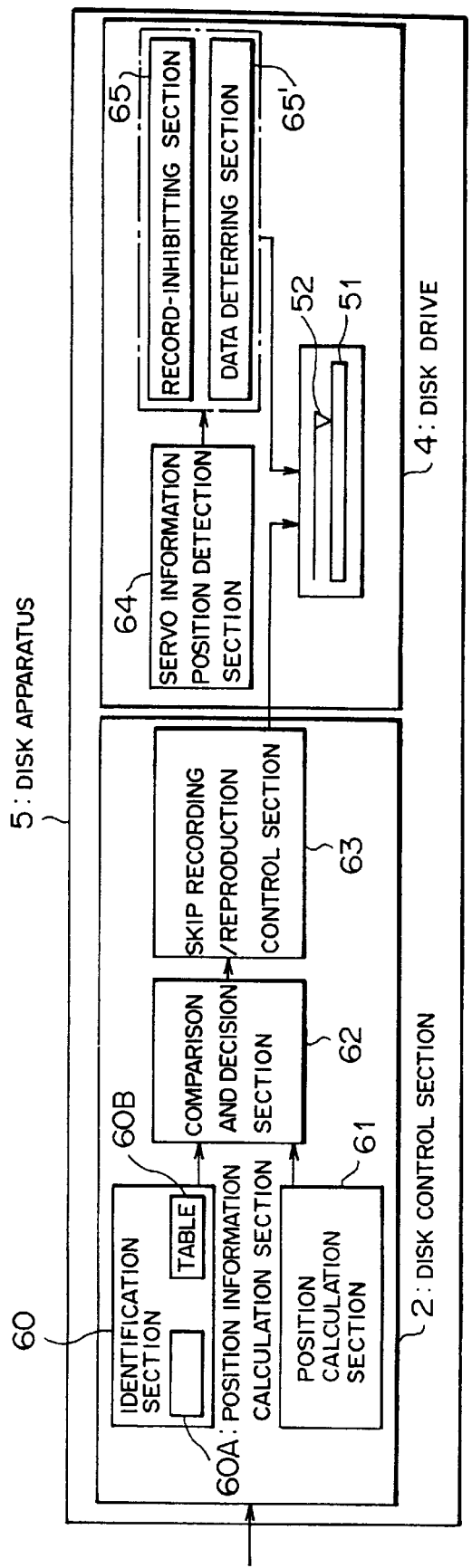
FIGS. 1 to 5 are block diagrams showing the aspects of a disk apparatus of the present invention.

FIG. 1 is a block diagram showing an aspect of a disk apparatus of the present invention. A disk apparatus 5 shown in FIG. 1 comprises a disk medium 51 having a data plane for storing head positioning servo information and record information, a disk drive 4 which rotates the disk medium 51 and records/reproduces information via a head 52, and a disk control section 2 which controls the disk drive 4 in accordance with instructions from a higher-level device.

The disk control section 2 comprises identification section 60, position calculation section 61, comparison and decision section 62, and skip recording/reproduction control section 63.

The identification section 60 identifies information regarding positions on the disk medium 51 at which the head positioning servo information is stored. The position calculation section 61 calculates the position on the disk medium 51 at which recording/reproduction of record information is to be performed.

Each time the comparison and decision section 62 receives a predetermined command from the higher-level device, it compares the information regarding the position identified by the identification section 60 with the position information calculated by the position calculation section 61, thereby deciding whether or not the position identified by the identification section 60 is the position at which recording or reproduction of record information is performed.

The skip recording/reproduction control section 63 operates based on the result of the comparison made by the comparison and decision section 62. When the position identified by the identification section 60 is the position at which recording or reproduction of record information is to be performed, the skip recording/reproduction control section 63 carries out a control operation such that the position identified by the identification section 60 is skipped to avoid the recording information from being recorded and/or reproduced there.

The record information may comprise data information, and count information which designates the length of the data information. Further, the record information may comprise, the data information, key information which represents the attribute of the data information, and the count information representing the length of the data information.

The information regarding the position identified by the identification section 60 and the position information calculated by the position calculation section 61 can be respectively constructed from segment information.

The identification section 60 may comprise position information calculation section 60A which calculates the information regarding a position by use of data regarding an interval between the adjacent head positioning servo information items, and a table 60B for previously storing the information regarding the position.

The disk apparatus 5 can further comprise servo information position detection section 64 which detects the information regarding the position on the disk medium 51 at which the head positioning servo information is stored. In this case, the disk apparatus 5 can further comprise record-inhibiting section 65 which inhibits the recording of the record information on the basis of the detected information received from the servo information position detection section 64.

The disk drive 4 can be provided with data deterring means which prevents the reading of the head positioning servo information from the data plane when the disk drive 4 receives a record retrieve control from a higher-level device.

The length of the head positioning servo information stored in the data plane may be set so as to be different from, or to be identical with, the length of the medium deficiency avoidance area for avoiding a deficiency of the disk medium 51.

The head positioning servo information recorded on the data plane can consist of data in the data area which includes data for use in positioning the head 52 and data in an area for synchronization purposes continued from the data area.

In the disk apparatus 5 of the present invention, the disk control section 2 is provided with the identification section 60, the position calculation section 61, the comparison and decision section 62, and the skip recording/reproduction control section 63. Consequently, it is possible to record/reproduce data while avoiding the head positioning servo information. Further, it becomes possible for even the sector-servo type disk apparatus to use the CKD format that deals with variable-length data, which in turn enables effective use of the storage capacity of the disk apparatus.

In the disk apparatus 5 of the present invention, the record information can comprise data information, and count information which represents the length of the data information. Further, the record information may comprise, data information, key information which represents the attribute of the data information, and count information designating the length of the data information. Consequently, it is possible to use desired record information depending on applications.

Further, in the disk apparatus 5 of the present invention, the information regarding the position identified by the identification section 60 and the position information calculated by the position calculation section 61 can be respectively constructed from segment information. Consequently, it becomes possible to correctly position the head 52.

Further, in the disk apparatus 5 of the present invention, the identification section 60 comprises the position information calculation section 60A, which makes it possible to save the storage capacity of the table 60B for previously storing the information regarding the position. The identification section 60 is provided with the table 60B. The identification section 60 quickly identifies the position information, and it is possible to record/reproduce data by quickly avoiding the head positioning servo information.

In the present disk apparatus 5, the disk drive 4 is provided with the servo information position detection section 64 and the record-inhibiting section 65 which inhibits the recording of the record information on the basis of the detection information received from the servo position detection section 64. Consequently, the erasure of the head positioning servo information due to an erroneous operation or the like can be prevented, which in turn results in improved reliability of the disk apparatus 5.

In the disk apparatus 5 of the present invention, the disk drive 4 is provided with the data deterring means 65' which prevents the reading of the head positioning servo information from the data plane when the disk drive 4 receives a record retrieve control signal from a higher-level device. Consequently, erroneous operation of the disk apparatus 5 can be prevented.

In the disk apparatus 5 of the present invention, the length of the head positioning servo information stored in the data plane is set so as to be different from the length of the medium deficiency avoidance area for avoiding a deficient portion of the disk medium 51. Consequently, it is possible to set the lengths of the head positioning servo information and the medium deficiency avoidance area to optimum lengths, respectively. As a result of the head positioning servo information and the medium deficiency avoidance area being set to the same length, a command is commonly used for avoiding the head positioning servo information and for avoiding the medium deficiency avoidance area, which in turn makes it possible to simplify control operations.

In the disk apparatus 5 of the present invention, the head positioning servo information recorded on the data plane consists of data in the data area which includes data for use in positioning the head 52 and data in the area for synchronization purposes continued from the data area. The processing required to read the data can be simplified.

Figure 2:
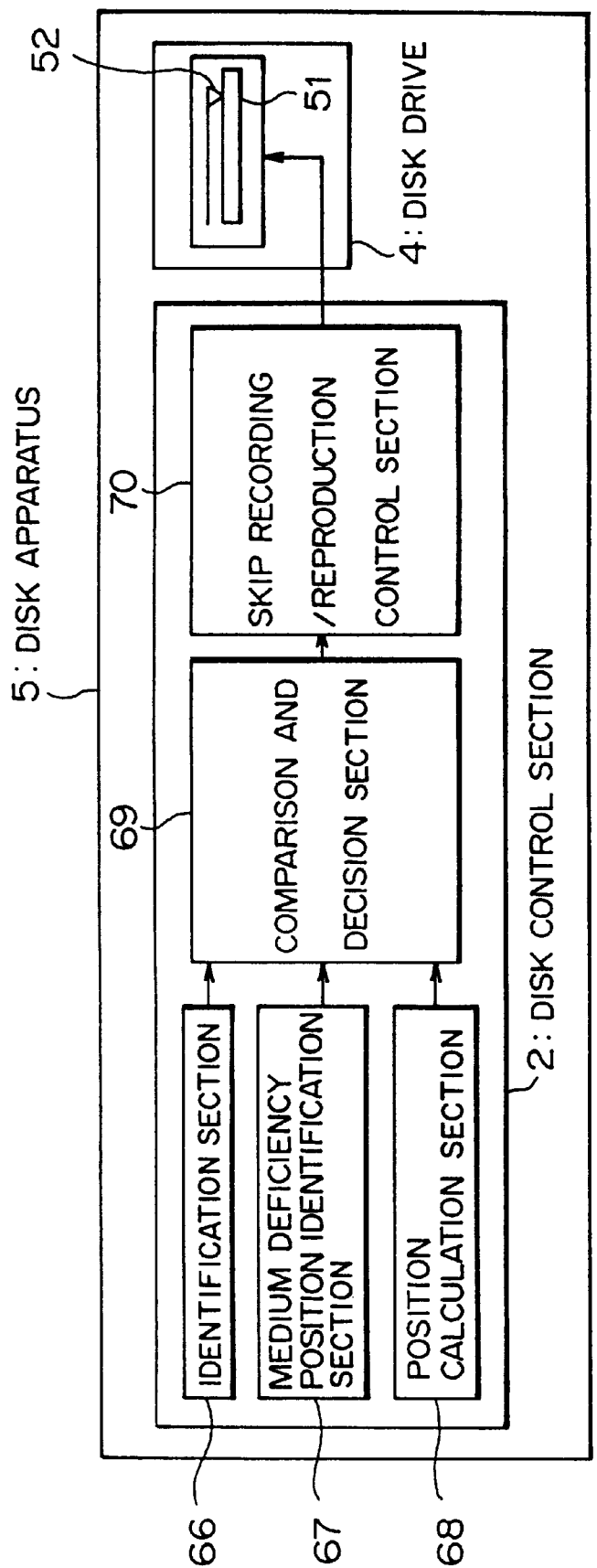

FIG. 2 is a block diagram showing another aspect of the configuration of the disk apparatus of the present invention. The disk apparatus 5 shown in FIG. 2 comprises a disk medium 51 having a data plane for storing disk positioning servo information and record information, a disk drive 4 which drives the disk medium 51 and records/reproduces information via a head 52, and a disk control section 2 which controls the disk drive 4 in accordance with instructions from a higher-level device.

The disk control section 2 comprises identification section 66, medium deficiency position identification section 67, position calculation section 68, comparison and decision section 69, and skip recording/reproduction control section 70.

The identification section 66 identifies-information regarding the position on the disk medium 51 at which the head positioning servo information is stored. The medium deficiency position identification section 67 identifies information regarding the position of a deficient portion on the disk medium 51 based on the information recorded on the disk medium 51.

The position calculation section 68 calculates the position on the disk medium 51 at which recording/reproduction of record information is to be performed.

Each time the comparison and decision section 69 receives a predetermined command from the higher-level device, it compares the information regarding the position identified by the identification section 66 or the medium deficiency position identification section 67 with the position information calculated by the position calculation section 68, and decides whether or not the position identified by the identification section 66 or the medium deficiency position identification section 67 is the position at which recording or reproduction of record information is performed.

The skip recording/reproduction control section 70 operates on the basis of the result of the comparison judgment made by the comparison and decision section 69. When the position identified by the identification section 66 or the medium deficiency position identification section 67 is the position at which recording or reproduction of record information is to be performed, the skip recording/reproduction control section 70 carries out a control operation such that the position identified by the identification section 66 or the medium deficiency position identification section 67 is skipped to avoid the record information from being recorded and/or reproduced there.

In the disk apparatus 5 of the present invention, the disk control section 2 is provided with the identification section 66, the medium deficiency position identification section 67, the position calculation section 68, the comparison and decision section 69, and the skip recording/reproduction control section 70. Consequently, it is possible to record/reproduce data while avoiding the head positioning servo information. Further, it is possible to record/reproduce the data while avoiding a medium deficient area, as in the case of a general disk apparatus, even if the disk medium 51 has the deficient area. Therefore, it becomes possible for even the sector-servo type disk apparatus to use the CKD format that deals with variable-length data, which in turn enables effective use of the storage capacity of the disk apparatus.

Figure 3:
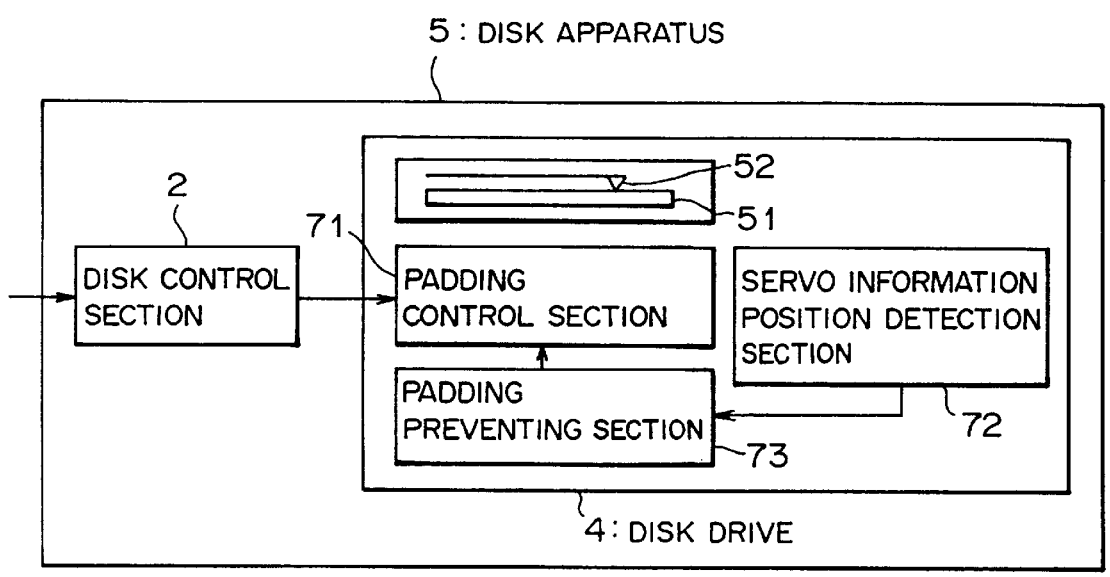

FIG. 3 is a block diagram showing still another aspect of the configuration of the disk apparatus of the present invention. The disk apparatus 5 shown in FIG. 3 comprises a disk medium 51 having a data plane for storing disk positioning servo information and record information, a disk drive 4 which drives the disk medium 51 and records/reproduces information via a head 52, and a disk control section 2 which controls the disk drive 4 in accordance with instructions from a higher-level device.

The disk drive 4 comprises a padding control section 71, servo information position detection section 72, and padding preventing section 73.

The padding control section 71 controls the erasure of data. The servo information position detection section 72 detects information regarding the position on the disk medium at which the head positioning servo information is stored. The padding preventing section 73 prevents the padding control section 71 from performing erasing operation at the position where the head positioning information is stored, on the basis of the position information detected by the servo information position detection section 72.

In such a disk apparatus 5 of the present invention, the disk drive 4 is provided with the padding control section 71, the servo information position detection section 72, and the padding preventing section 73. The disk drive can perform a padding operation without receiving control of the disk control section, as in the case of a general disk apparatus, even when the sector-servo type disk apparatus uses the CKD format that deals with variable-length data.

Figure 4:
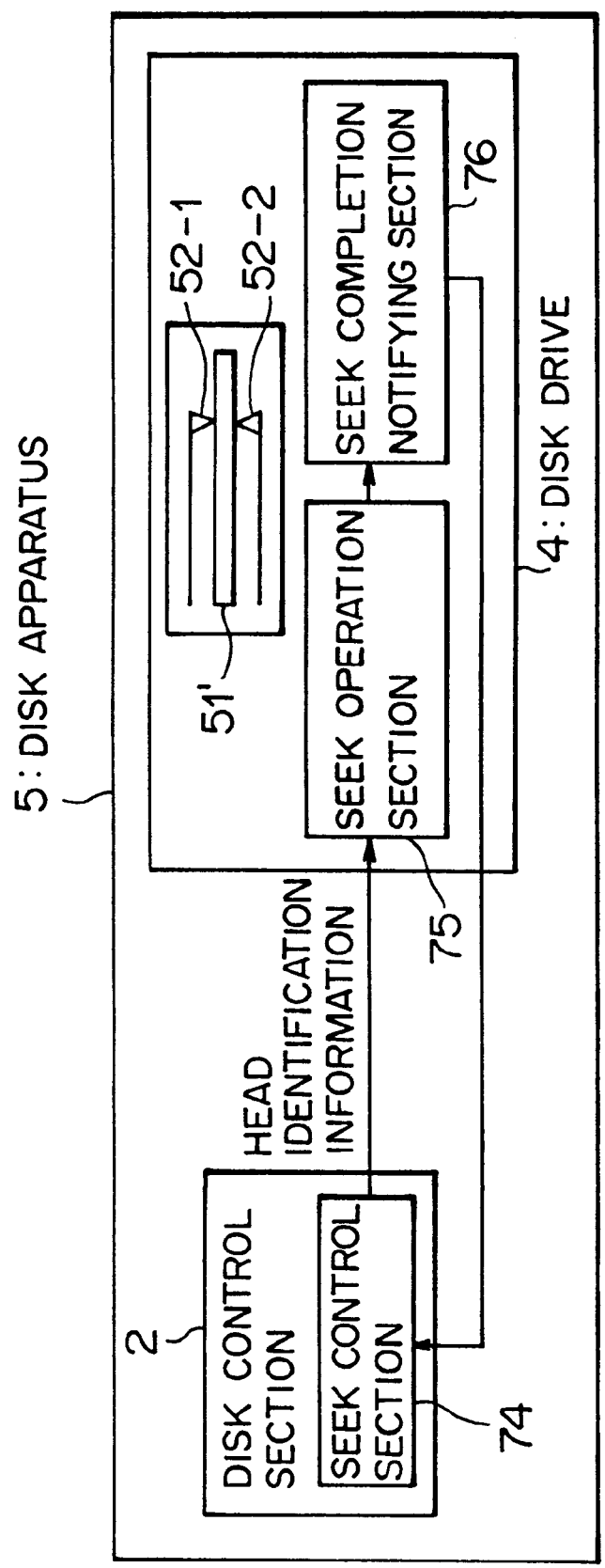

FIG. 4 is a block diagram showing still another aspect of the configuration of the disk apparatus of the present invention. The disk apparatus 5 shown in FIG. 4 comprises a disk medium 51' having a plurality of data planes for storing head positioning servo information and record information, the record information including data information and count information which represents the length of the data information. The disk apparatus 5 further comprises a disk drive 4 which drives the disk medium 51' and records/reproduces information via heads 52-1 and 52-2, and a disk control section 2 which controls the disk drive 4 in accordance with instructions from a higher-level device.

The disk control section 2 is provided with a seek control section 74 which outputs information for identifying the head 52-1 - 52-2 to be subjected to a seek operation to the disk drive 4 together with a seek command for controlling the disk drive so as to carry out the seek operation. The disk drive 4 is provided with a seek operation section 75 which carries out the seek operation upon receipt of the seek command and head identification information from the seek control section 74.

The disk drive 4 is provided with seek completion notifying section 76 which notifies the disk control section 2 that the processing corresponding to the seek command has been completed after the seek operation section 75 has completed the seek operation and after the positioning of the head 52-1, 52-2 has been completed on the basis of the head positioning servo information recorded on the data plane.

In such a disk apparatus 5 of the present invention, the disk control section 2 is provided with the seek control section 74, and the disk drive 4 is provided with the seek operation section 75. As a result, it is possible to position the head 52-1, 52-2 on the data plane more quickly. The disk drive 4 is provided with the seek completion notifying section 76, and hence it is possible to reliably record/reproduce the data.

Figure 5:
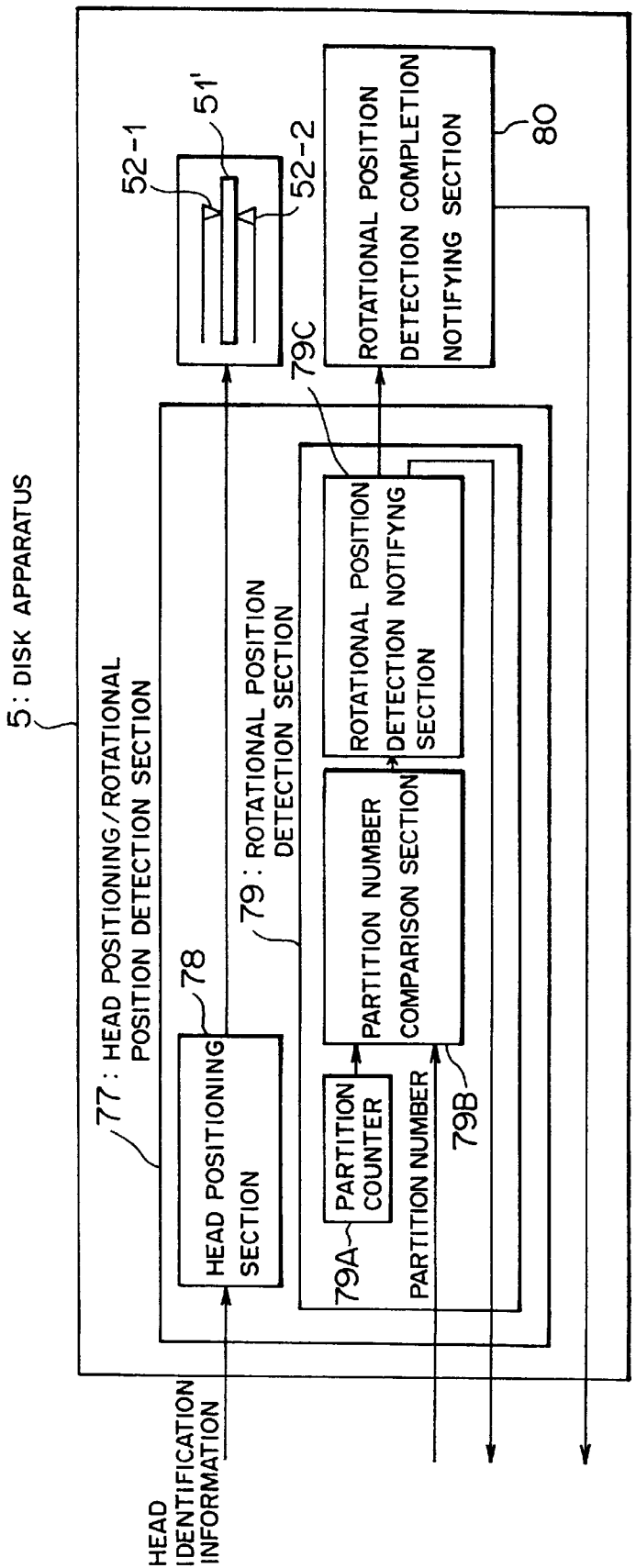

FIG. 5 is a block diagram showing still another aspect of the configuration of the disk apparatus of the present invention. The disk apparatus 5 shown in FIG. 5 comprises a disk medium 51' having a plurality of data planes for storing head positioning servo information and record information, and records/reproduces information via heads 52-1 and 52-2 provided for the respective data planes of the disk medium 51'.

The disk apparatus 5 is provided with a head positioning/rotational position detection section 77 which receives a rotational position detection command for controlling the head so as to detect a specified rotational position and information for identifying the heads 52-1 and 52-2 by which the rotational position is to be detected, and which positions the head and detects the specified rotational position.

The memory area of the disk medium 51' is divided into a predetermined number of partitions, and the rotational position designated by the rotational position detection command consists of a partition number assigned to a corresponding partition. The head positioning/rotational position detection section 77 can be composed of a head positioning section 78 and a rotational position detection section 79. The head positioning section 78 positions the heads 52-1 and 52-2 on the basis of the head positioning servo information recorded on the corresponding data plane upon receipt of the information, which identifies a head by which the rotational position is to be detected. The rotational position detection section 79 comprises a partition counter 79A, partition number comparison section 79B, and a rotational position detection notifying section 79C. The partition counter 79A is reset when the heads 52-1 and 52-2 are situated at the starting position on the data plane of the disk medium 51', and counts up a partition count value in synchronism with the period within which the heads 52-1 and 52-2 pass through the partition. The partition number comparison means 79B compares the partition count value received from the partition counter 79A with the partition number specified by the rotational position detection command. The rotational position detection notifying section 79C notifies the higher-level device of the detection of the rotational position when it is judged, on the basis of the result of the comparison made by the partition number comparison section 79B, that the partition count value agrees with the partition number.

The disk apparatus 5 can also comprise rotational position detection completion notifying section 80. The rotational position detection completion notifying section 80 notifies the higher-level device of the completion of the processing corresponding to the rotational position detection command after the head positioning/rotational position detection section 77 has detected the rotational position, and that the head 52-1, 52-2 has been positioned on the basis of the head positioning servo information recorded on the data plane.

The disk apparatus 5 may comprise rotational position converting means for converting a specified rotational position to a value corresponding to the identification information of the heads 52-1 and 52-2.

In such a disk apparatus 5, the head positioning/rotational position detection section 77 enables quicker completion of the detection of the rotational position carried out in response to the rotational position detection command. Further, the rotational position detection completion notifying section 80 notifies the higher-level device of the completion of the processing corresponding to the rotational position detection command, which makes it possible to perform the recording/reproduction of data more reliably.

Further, since the disk apparatus 5 comprises the rotational position converting section for converting the specified rotational position to the value corresponding to the identification information of the heads 52-1 and 52-2, a rotational position can be corrected in the case of a staggered-index disk apparatus which have different starting positions for the respective heads 52-1 and 52-2. As a result, the disk apparatus can be compatible with a general disk apparatus.

The disk apparatus of the present invention includes a disk medium which has a data plane for storing head positioning servo information and record information, and the information is recorded/reproduced by way of a head provided for the data plane. The disk apparatus is characterized in that the disk medium is arranged such that the head positioning servo information is spaced a predetermined distance away from a track starting position.

In the disk apparatus of the present invention, it is possible to quickly record/reproduce data by rapidly completing the head positioning control after a head switching operation has been finished.

The disk apparatus of the present invention includes a disk medium that has a plurality of data planes for storing head positioning servo information and record information, the record information including data information and count information regarding the length of the data information. The disk apparatus records the information on or reproduces the information from the disk medium via the heads provided for the respective data planes of the disk medium. The disk apparatus is characterized in that the disk medium has a structure in which the starting positions of the plurality of data planes are delayed by predetermined distances corresponding to the respective data planes. Each of the predetermined distances is an integral multiple of the distance between the head positioning servo information to the next head positioning servo information.

In such a disk apparatus of the present invention, the disk medium is configured such that the starting positions of the plurality of data planes are delayed by predetermined distances corresponding to the data planes. As a result, it is possible to quickly record/reproduce data by rapidly completing a head positioning control after the head switching operation has been finished. Further, if each of the predetermined distances is an integral multiple of the distance between the head positioning servo information to the next head positioning servo information, the control associated with the head switching operation is simplified, which in turn enables an improvement in the accuracy of head positioning control.

The disk apparatus of the present invention comprises a disk medium which has a data plane for storing head positioning servo information and record information including data information and count information regarding the length of the data information, a disk drive which records the information on or reproduces the information from the disk medium via the head, and a disk control section which controls the disk control in accordance with instructions from a higher-level device.

In such a disk apparatus of the present invention, it becomes possible for the sector-servo type disk apparatus to use the CKD format that deals with variable-length data.

The recording/reproduction method of the present invention is for use with a disk apparatus that includes a disk medium having a plurality of data planes for storing head positioning servo information and record information, a disk drive that drives the disk medium and records information on or reproduces the information from the disk medium via the head, and a disk control section for controlling the disk drive in accordance with the instructions received from a higher-level device. The recording/reproduction method is characterized by comprising the step of receiving a read control command or a write control command subsequent to a head switch command for carrying out switching among the heads so that one of the heads is selected, and notifying the disk control section of read/write enable/disenable information, based on the number of areas on the data plane, where the head positioning servo information is written, passed by the head.

If the head has not passed a predetermined number of areas, the disk drive notifies the disk control section that read/write operations are impossible. If the head has passed the predetermined number of areas, the disk drive notifies the disk control section that the read/write operations are possible.

In such a recording/reproduction method of the present invention for use with the disk apparatus, the read/write enable/disenable information is notified of the disk control section in response to the number of areas on the data plane, where the head positioning servo information is written, passed by the head. Particularly, when the head has not passed a predetermined number of areas, the disk drive notifies the disk control section of the read/write disenable information. When the head has passed the predetermined number of areas, the disk drive notifies the disk control section of the read/write enable information. As a result, it becomes possible to ensure the control of the reading/writing of data. If the read/write is enabled, it is possible to immediately read/write the data, which in turn results in an improvement of data read/write efficiency.

(b) Embodiment of the Present Invention

An embodiment of the present invention will now be described with reference to the accompanying drawing.

(1) Configuration of Disk Apparatus

Figure 6:
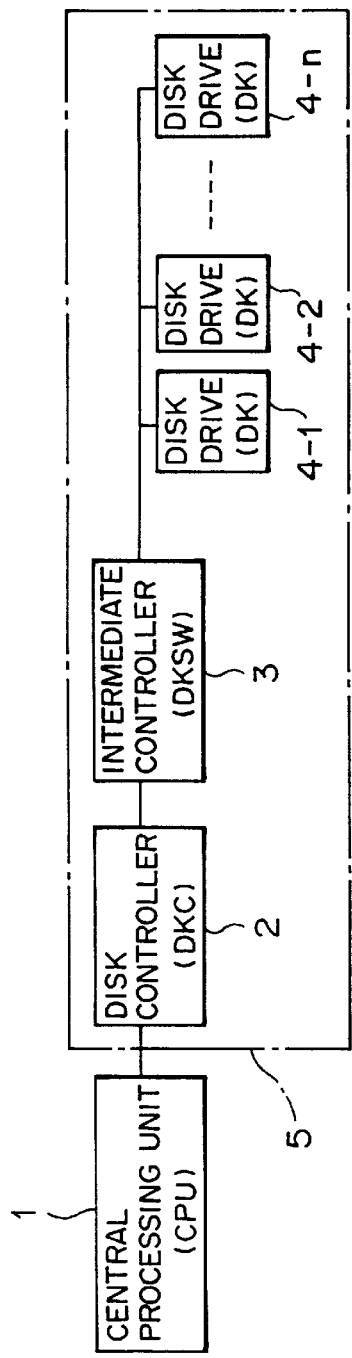
FIG. 6 is a block diagram showing the configuration of a disk apparatus according to one embodiment of the present invention.

FIG. 6 is a block diagram showing the configuration of a disk apparatus according to one embodiment of the present invention. The disk apparatus 5 shown in FIG. 6 comprises a disk controller (DKC: DISK CONTROLLER) 2 which acts as a disk control section, an intermediate controller (DKSW: DISK SWITCHER) 3, and disk drives (DK: DISK DRIVE) 4-1 to 4-n.

The disk drives 4-1 to 4-n act as I/O devices, namely, they rotate disk mediums 51-1 to 51-3 (see FIG. 8) and record/reproduce information via heads 52A to 52C (see FIG. 8) in accordance with instructions received from a higher-level controller.

Head positioning servo information and record information (comprising data information, key information which represents the attribute of the data information, and count information which represents the length of the data information) are recorded on a data plane of the disk mediums 51-1 to 51-3.

In other words, these sector-servo type disk drives 4-1 to 4-n are arranged so as to employ a CKD format.

The disk controller 2 controls the recording/reproduction of data carried out by the disk drives 4-1 to 4-n in accordance with an instruction from a higher-level device such as a central processing unit (CPU) 1 or the like. This control is carried out via the intermediate controller 3.

Figure 7:
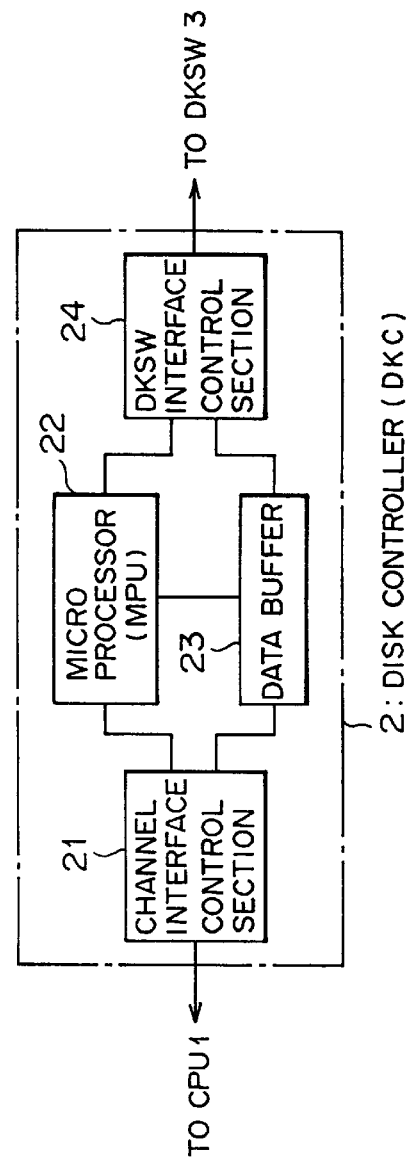
FIG. 7 is a block diagram showing the configuration of a disk controller in the embodiment of the present invention.

The disk controller 2 comprises a channel interface control section 21, a microprocessor (MPU) 22, a data buffer 23, and an intermediate controller/interface control section (DKSW/interface control section) 24, as shown in FIG. 7 in a detailed manner.

The channel interface control section 21 controls the interface between the disk controller 2 and the CPU 1. The intermediate controller/interface control section 24 controls the interface between the disk controller 2 and the intermediate controller 3.

The microprocessor (MPU) 22 carries out practical control operations of the disk controller 2. The data buffer 23 temporarily holds the data input to the disk drives 4-1 to 4-n and the data output from the disk drives 4-1 to 4-n.

Figure 8A:
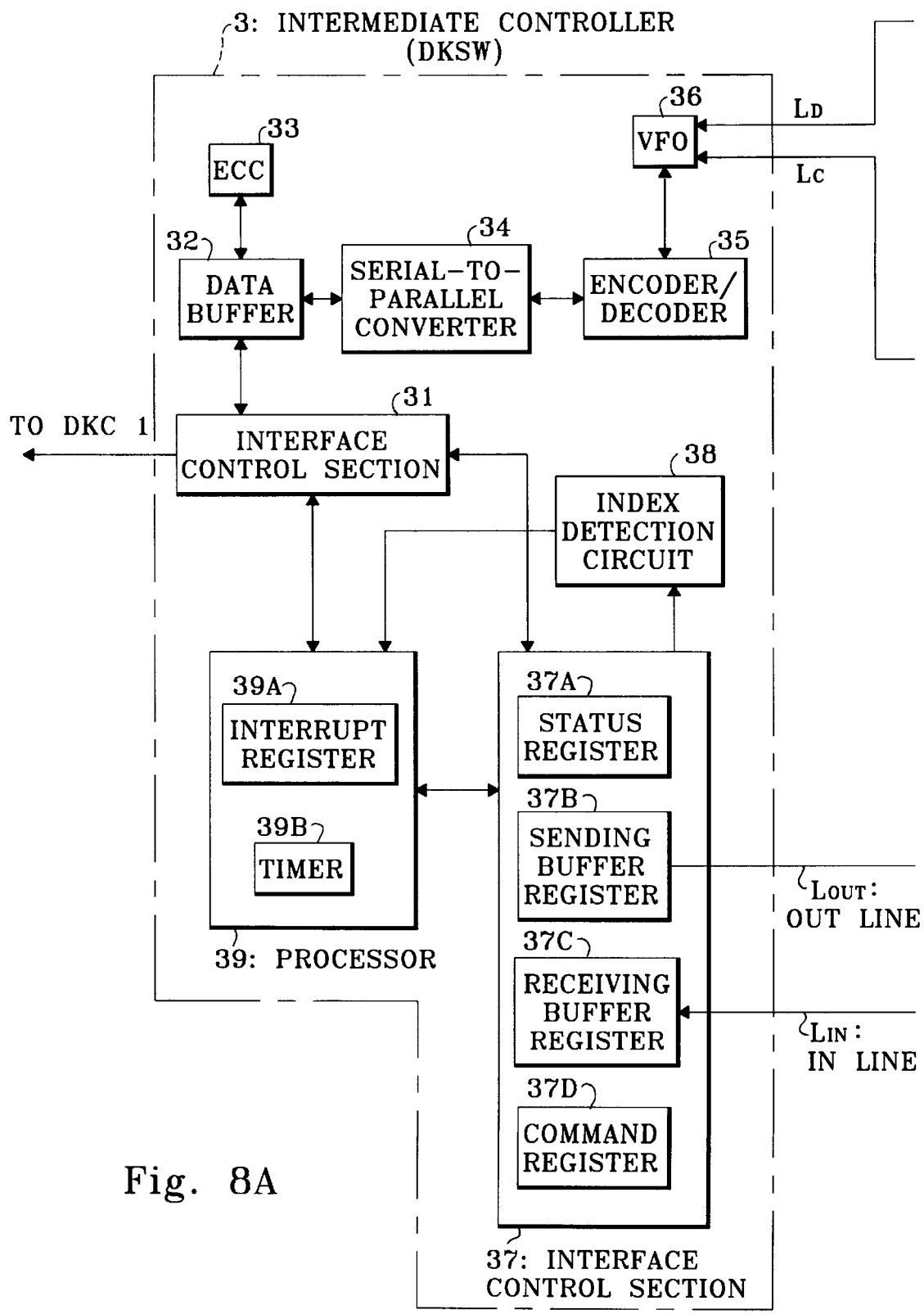
FIG. 8 which is divided into two sections 8A and 8B, is a block diagram showing the configuration of an intermediate controller and a disk drive in the embodiment of the present invention.
Figure 8B:
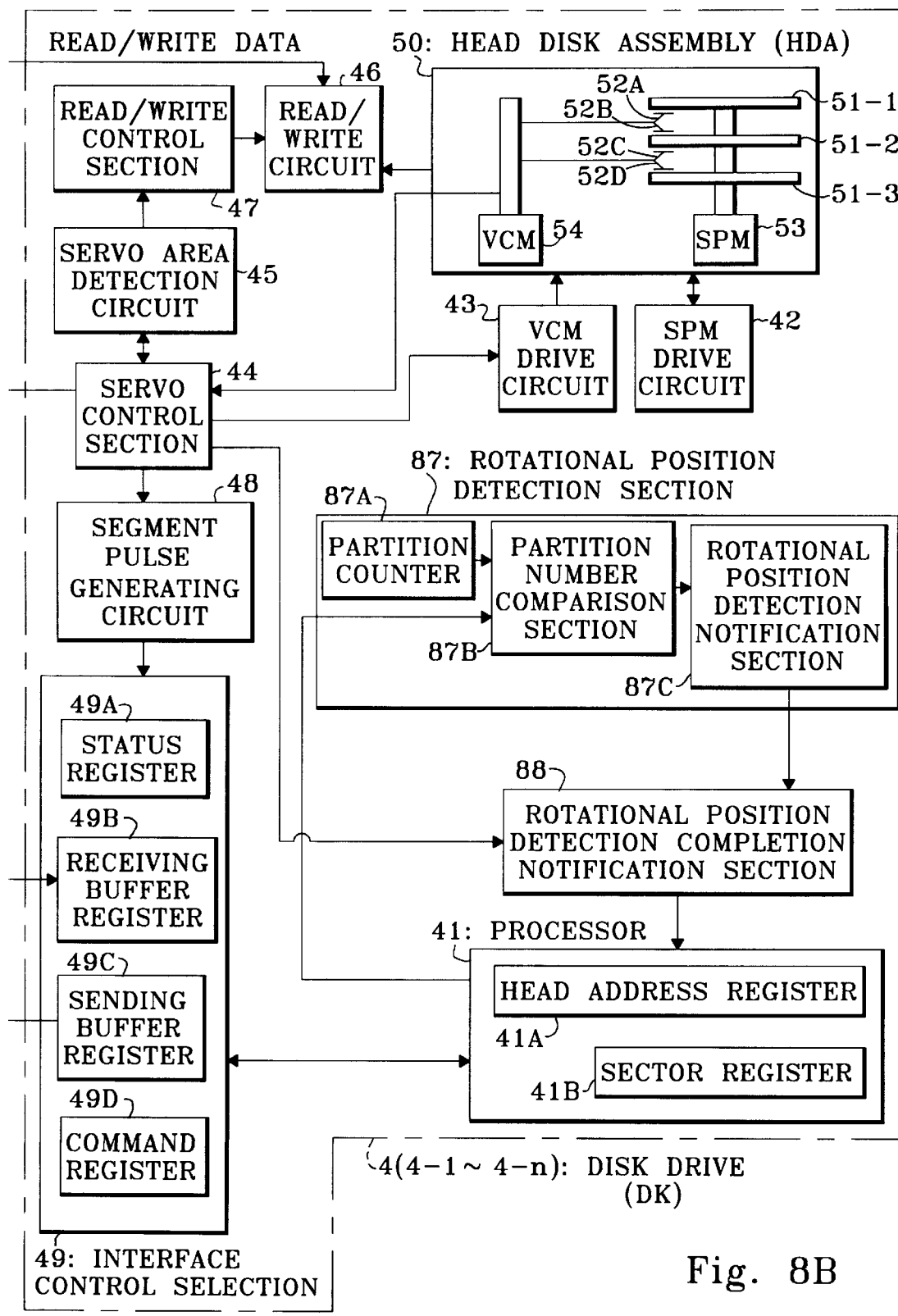

The intermediate controller 3 and the disk drives 4-1 to 4-n have such configurations as shown in FIG. 8 in a detailed manner (only one of the disk drives 4-1 to 4-n is exemplarily illustrated in the drawing).

The intermediate controller 3 and the disk drives 4-1 to 4-n (hereinafter often referred to simply as a disk drive 4) are connected to each other via interface cables for sending and receiving control information (i.e., an OUT line $L_{out}$ and an IN line $L_{in}$), a bi-directional serial interface cable $L_D$ for transmitting read/write data, and a signal line $L_c$ for transmitting a servo clock signal in synchronism with the rotation of the disk medium.

The configuration of the intermediate controller 3 will first be described in detail hereinbelow.

Reference numeral 31 denotes an interface control section which sends data to or receive data from the disk controller 2, 32 denotes a data buffer for storing data to be written and read data, and 33 denotes an error detection/correction circuit (ECC: ERROR CORRECTION CIRCUIT) for detecting data errors.

Reference numeral 34 denotes a serial-to-parallel converter. This serial-to-parallel converter 34 converts the parallel data received from the disk controller 2 into serial data, as well as converting the serial data received from the disk drive 4 into parallel data.

Reference numeral 35 denotes an encoder/decoder. This encoder/decoder 35 encodes the serial data received from the serial-to-parallel converter 34 into a 1/7 RLL code (1/7 RUN-LENGTH LIMITED CODE), as well as decoding the serial data of the 1/7 RLL code read by the disk drive 4.

Reference numeral 36 denotes a variable frequency oscillator (VFO) having a PLL configuration. When data are written (i.e., recorded), the VFO 36 generates a write clock signal in synchronism with the servo clock signal received from the disk drive 4 through the clock signal line $L_c$. The data are sent to the disk drive 4 through the data signal line $L_D$ on a bit-by-bit basis in synchronism with the write clock signal. When data are read (reproduced), a read clock signal is generated from a train of bits serially received from the disk drive 4. The data are sent to the encoder/decoder 35 on a bit-by-bit basis in synchronism with the read clock signal.

Reference numeral 37 denotes an interface control section which sends control information to or receives it from the disk drive 4. The interface control section 37 comprises a status register 37A for storing the state of the interface control section 37, a sending buffer register 37B for storing the control information to be sent to the disk drive 4, a receive buffer register 37C for storing the control information received from the disk drive 4, and a command register 37D for storing the interface control commands received from a processor 39.

Reference numeral 38 denotes an index detection circuit. The index detection circuit 38 detects an index marker which indicates the starting position of a track in the disk medium from segment pulses (which will be described later) received through the IN line $L_{in}$ from the disk drive 4.

Reference numeral 39 denotes a processor for controlling the overall intermediate controller 3. This processor 39 sets into the send buffer register 37B of the interface control section 37 the control information to be sent to the disk drive 4, as well as setting an interface control command into the command register 37D, as required. Further, the processor 39 reads the control information that is stored in the receive buffer register 37C from the disk drive 4, as well as making the status data stored in the status register 37A readable, as required. The processor 39 comprises an interrupt register 39A which stores the interruption status of the disk drive 4 and a timer 39B.

The configuration of the disk drive 4 will now be described in detail.

Reference numeral 50 denotes a head disk assembly (HDA). The head disk assembly 50 comprises a plurality of disk mediums and heads facing respective disk planes of the disk mediums (the HDA 50 shown in FIG. 8 comprises three disk mediums 51-1 to 51-3 and heads 52A, 52B, 52C, and 52D), a spindle motor (SPM) 53 for rotating all the disk mediums 51-1 to 51-3 together, and a voice coil motor (VCM) 54 for positioning the heads at predetermined track areas by moving them in an integrated fashion.

In the HDA 50, the disk surfaces of the disk mediums 51-1 to 51-3 that face the respective heads 52A to 52C are data planes. The CKD format that deals with variable-length data, which will be described later, is applied to the data planes. Head positioning servo information is recorded on the data planes.

The disk surface of the disk medium 51-3 that faces the head 52D is a servo plane. Information regarding the positions on the data plane where desired head positioning servo information is recorded (the servo information recorded over the entire memory area) is recorded on the servo plane.

The HDA 50 is of a hybrid of a servo-plane-servo type and a sector-servo type. In other words, by using the head 52D, the HDA 50 reads the servo information which is recorded on the servo plane so as to cover the entire memory area thereof. The positioning of the heads 52A to 52C is roughly controlled using the servo information. Thereafter, the head positioning servo information recorded on the data plane is read by use of the heads 52A to 52C. On-track control of the heads 52A to 52C is carried out using the thus-read servo information.

As previously described, the servo information is recorded on both the servo plane and the data plane in the hybrid type HDA. The servo information which covers the entire memory area is recorded on the servo plane. The retrieval and reading of desired servo information are rapidly completed, and the servo information for on-track control purposes is recorded on the data plane. Consequently, tracking shift is prevented from arising because of thermal off-track that results from the recording of the servo information only on the servo plane.

In the disk apparatus 5 of the present embodiment, the head is quickly and correctly positioned by use of the above-described hybrid type HDA 50.

Reference numeral 41 denotes a processor for controlling the entire disk drive 4. The processor 41 comprises a head address register 41A which stores the current address of the head that is the information regarding the head position, and a sector register 41B for storing a rotational position (a partition number) specified by the rotational position detection command, which will be described later.

Reference numeral 42 denotes a spindle motor drive circuit (an SPM drive circuit) for rotating the spindle motor, and reference numeral 43 denotes a voice coil motor drive circuit (VCM drive circuit) for driving the voice coil motor.

Reference numeral 44 denotes a servo control section. The servo control section 44 generates a servo clock signal in synchronism with the rotation of the disk mediums 51-1 to 51-4 on the basis of a read-out signal from the head, as well as controlling the positioning of the head in accordance with the instructions received from the processor 41.

Reference numeral 45 denotes a servo area detection circuit. The servo area detection circuit 45 converts the servo signal received from the servo control section 44 into a servo area signal that represents the detection of a servo area, and the thus-converted signal is output. The details of the servo area detection circuit will be described later.

Reference numeral 46 denotes a read/write circuit. The read/write circuit 46 is connected to the heads 52A to 52C. When data are written (recorded), a write signal based on the data received from the intermediate controller 3 through the data signal line $L_D$ is input to the heads 52A to 52C. When data are read (reproduced), read data based on the signals read by the heads 52A to 52C are sent to the data signal line $L_D$.

Reference numeral 47 denotes a read/write control section. The read/write control section 47 controls the recording/reproduction of data via the read/write circuit 46 in accordance with instructions from the processor 41.

Reference numeral 48 denotes a segment pulse generating circuit. This segment pulse generation circuit 48 divides the data recorded on the track of the disk mediums 51-1 to 51-3 into segments having a predetermined distance (e.g., 32 bytes). A segment pulse is generated for each of the segments. The segment pulse generating circuit 48 inserts an index marker, which represents the starting position of the track, into the segment pulses.

Reference numeral 49 denotes an interface control section which sends control information to or receives it from the intermediate controller 3. Like the interface control section 37 of the intermediate controller 3, the interface control section 49 comprises a status register 49A for storing the state of the interface control section 49, a receiving buffer register 49B for storing the control information received from the intermediate controller 3, a sending buffer register 49C for storing the control information to be sent to the intermediate controller 3, and a command register 49D for storing an interface control command under control of the processor 41.

Reference numeral 87 denotes a rotational position detection section. The rotational position detection section 87 detects the rotational position specified by a partition number in the case where the disk mediums 51-1 to 51-3 are divided into predetermined partitions (these partitions are assigned the partition numbers). This rotational position detection section 87 comprises a partition counter 87A, a partition number comparison section 87B, and a rotational position detection notification section 87C. Their detailed descriptions will be provided later.

Reference numeral 88 denotes a rotational position detection completion notification section. This rotational position detection completion notification section 88 detects rotational positions. When the heads 52A to 52C are positioned on the basis of the head positioning servo information recorded on the data plane, the rotational position detection completion notification section 88 notifies a higher-level device of the completion of the processing corresponding to the rotational position detection command.

(1—1) Detailed Description of Servo Area Detection Circuit

The previously described servo area detection circuit 45 will further be described.

Figure 9:
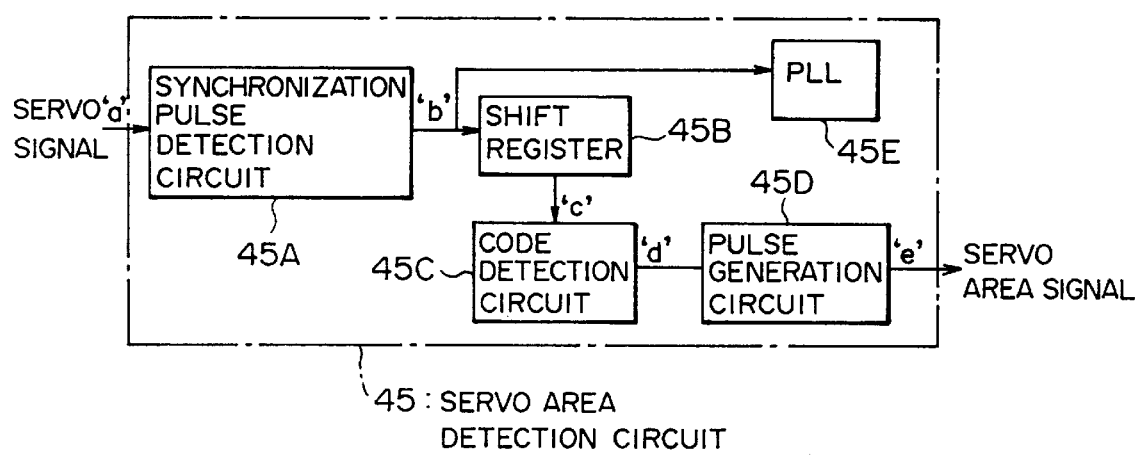
FIG. 9 is a block diagram showing the configuration of a servo area detection circuit in the embodiment of the present invention.

As previously described, the servo area detection circuit 45 converts the servo signal received from the servo control section 44. The thus-converted signal is output as the servo area signal. As shown in FIG. 9, the servo area detection circuit 45 comprises a synchronization pulse detection circuit 45A, a shift register 45B, a code detection circuit 45C, a pulse generation circuit 45D, and a PLL (Phase Locked Loop) 45E.

Figure 11:
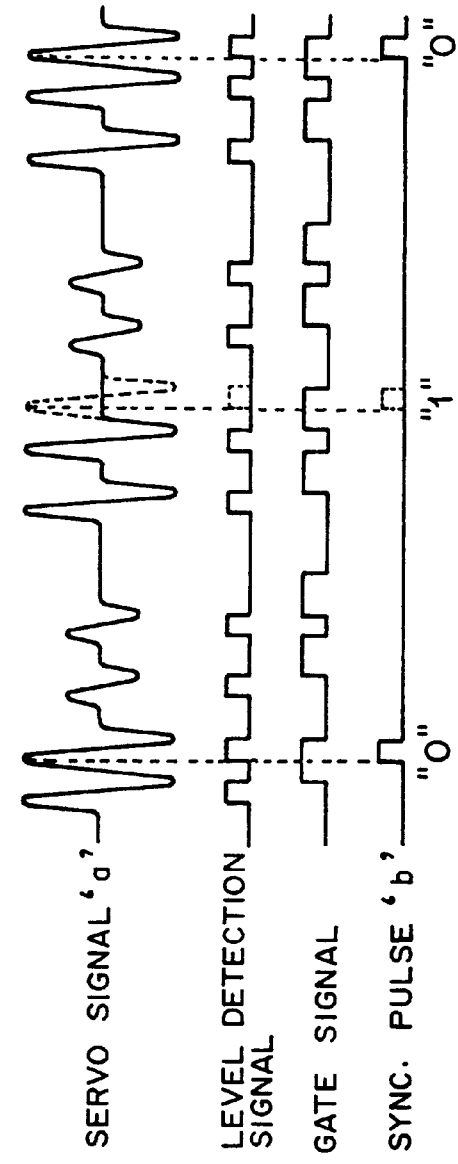
FIG. 11 is a timing chart for explaining the operation of a synchronization pulse detection circuit in the embodiment of the present invention.

The servo signal is a signal which is read from the servo plane and is indicated by "a" in FIG. 11. The servo signal comprises a synchronization pulse for PLL synchronization and a ODD/EVEN pulse for head positioning.

The synchronization pulse detection circuit 45A detects a synchronization pulse "b" for PLL synchronization purposes from the servo signal "a". The synchronization pulse detection circuit 45A generates a level detection signal by detecting the level of the servo signal "a" using a comparator (not shown), as shown in FIG. 11. A mono-multivibrator (not shown) is triggered by the thus-generated level detection signal, so that a gate signal is generated. As a result of the logical product of the gate signal and the thus-level-detected synchronization pulse signal (i.e., the level detection signal), the synchronization pulse "b" is detected.

The synchronization pulse "b" is defined as "0" when there is a pulse, whereas it is defined as "1" when there is no synchronization pulse. Such codes as listed in a code table in FIG. 13 are defined by combination of 0s and 1s.

A "servo area" representing that the heads 52A to 52C have reached the servo area on the data plane is indicated by a code "11001", and an "outer-guard band 2" representing the outermost area of the data plane is indicated by a code "01110". An "outer-guard band 1" used for detecting 0 cylinder is indicated by a code "01010", and an "inner guard band" representing the innermost area is indicated by a code "10011". An "index marker" used for representing the starting position of a physical track is indicated by a code "01011".

The shift register 45B outputs the synchronization pulse "b" received from the synchronization pulse detection circuit 45A on a bit-by-bit basis (the output signal is indicated by "c"). The code detection circuit 45C outputs a signal representing the detection of the "servo area" code (this signal is indicated by "d") on the basis of the signal "c" received from the shift register 45B.

The pulse generation circuit 45D outputs a servo area signal "e" including information regarding all the servo areas. For example, the pulse generation circuit 45D is made up of a timer circuit. If such servo area codes are successively recorded on the servo plane such that they cover all the servo areas on the data planes, the timer circuit will become unnecessary.

The PLL 45E generates various clock signals for use in actuating the servo area detection circuit 45 on the basis of the synchronization pulse received from the synchronization pulse detection circuit 45A.

In the servo area detection circuit 45 shown in FIG. 9, the synchronization pulse "b" detected by the synchronization pulse detection circuit 45A is input to the PLL 45E and the shift register 45B. The signal "c" of each bit is output to the code detection circuit 45C from the shift register 45B. The servo area code signal "d" detected by the code detection circuit 45C is input to the pulse generation circuit 45D. The pulse generation circuit 45D outputs the servo area signal "e" that includes information regarding all of the servo areas.

Figure 12:
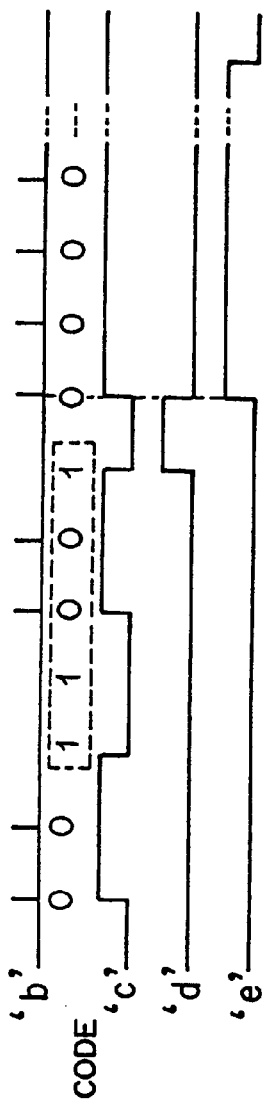
FIG. 12 is a timing chart for explaining the operation of a servo area detection circuit in the embodiment of the present invention.

FIG. 12 shows the timing chart of the signals "b" to "e" in the servo area detection circuit.

The synchronization pulse "b" detected by the synchronization pulse detection circuit 45A consists of 0s and 1s. The shift register 45B generates and outputs a 5-bit output signal "c".

The code detection circuit 45C generates the signal "d" as the signal representing the detection of the servo area code "11001" (the portion encircled by a broken line in FIG. 12) by outputting a high-level pulse at the boundary between the portion of the code "11001" and the portion of a code "0000 . . ." that corresponds to a servo area following the portion of the code "11001".

The pulse generation circuit 45D outputs the servo area signal "e" by outputting a high-level pulse in the area of the code "0000. . ." in the output signal "d" that corresponds to the servo area.

(2) Track Format

Figure 14B:
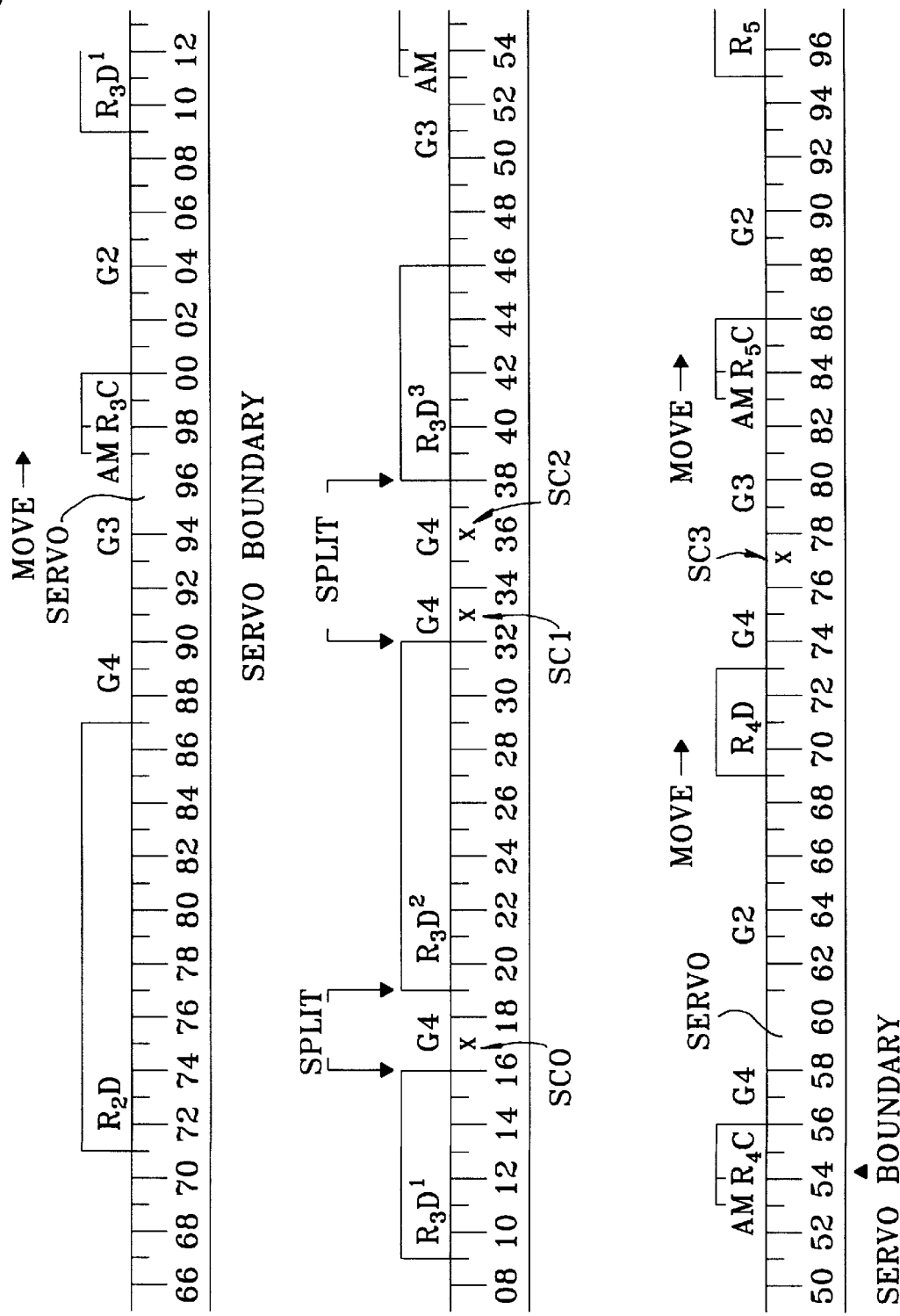
FIG. 14 which is divided into two sections 14A and 14B is a diagram showing a track format of a data plane of a disk medium used in the embodiment of the present invention.

With reference to FIG. 14, the track format of the data planes of the disk mediums 51-1 to 51-3 of the head disk assembly (HDA) 50 shown in FIG. 8 will now be described.

The track is divided into segments having a predetermined length (e.g., 32 bytes). These segments are sequentially assigned numbers from "00", which are used in a control operation.

In the servo-plane-servo type disk apparatus and the hybrid type disk apparatus having servo planes, the segment position cannot be correctly identified by use of the clock signal in synchronism with the rotation of the PLL. For this reason, the track is divided into the segments having a predetermined length, which enables correct control of the avoidance of the servo areas. As a result, the servo area in the track format is shortened. In the data-plane servo type disk apparatus without a servo plane, the segment can be identified by use of an oscillator such as a quarts oscillator, though it is inferior to the clock signal in synchronism with the PLL.

The index marker represents the starting position of the track. Flags showing a track address, a track failure, etc. are recorded in the home address (HA).

The record "0" at which the record information to be used in an operating system is recorded is composed of $R_0C$ and $R_0D$. Track addresses, track record numbers, or the like, are recorded in $R_0C$, whereas 8 bytes of data are recorded in $R_0D$.

Information of each record is recorded in a record "n" (n is an integer more than one) following a record "0". The record "n" consists of a count section ($R_nC$), a key section ($R_nK$), and a data section ($R_nD$).

Count information representing the length of the data information to be recorded in the data section ($R_nD$) is recorded in the count section ($R_nC$). The count information comprises the track address, a record number, the lengths of the key section ($R_nK$) and the data section ($R_nD$), the position of a deficiency of the disk medium, and the position of the record "n", which includes the count section ($R_nC$), on the track.

Key information representing the attribute of the data information to be recorded in the data section ($R_nD$) is recorded in the key section ($R_nK$). Retrieve information to be used in the operating system is recorded in the key section as the key information. The length of the key information may not be variable within 256 bytes. If no key information exists, the key section ($R_nK$) can be omitted.

Data information is recorded in the data section ($R_nD$). The data information is recorded in a variable length from one byte to the end of the track. The data section ($R_nD$) is partitioned by gaps (G1 to G3). The deficiency of the disk medium indicated by X in FIG. 13 is controlled by a gap (G4).

An address mark (AM) used for high-speed access to the record "n" exists in the leading end of each record "n".

Head positioning servo information is recorded in the servo area (this servo area is indicated by S in FIG. 14). The servo area consists of a sample servo area for controlling sector servo positioning operations and a synchronization area for synchronization of the VFO 36, as shown in FIG. 15.

The sample servo area consists of a switch area, a sample servo marker, a sample gain field, and a servo error field.

The switch area is used for ensuring the time required to switch the read/write circuit 46 of the disk drive 4 shown in FIG. 8 so that the head which writes data into the data section ($R_{n-1}D$) of a record "n-1" can read (reproduce) servo information from the servo area of the record "n".

The sample servo marker is used for identification and synchronization of sample servo in a sample servo area. The sample servo maker is used when accessing to the servo area S.

The sample gain field is used for controlling an AGC circuit (not shown) of the disk drive shown in FIG. 8. This sample gain field is used for maintaining the amplitude of the following servo error field constant.

The servo information for use in positioning the head at the center of the data track is actually written into the servo error field.

The synchronization area following the sample servo area is used for synchronization of the VFO 36 which reads (reproduces) data. The servo area S is provided with this synchronization area, which enables facilitation of the processing associated with reading of data as well as quick reading of the data.

A servo boundary exists three segments before the servo area in FIGS. 14 and 15.

Figure 10A:
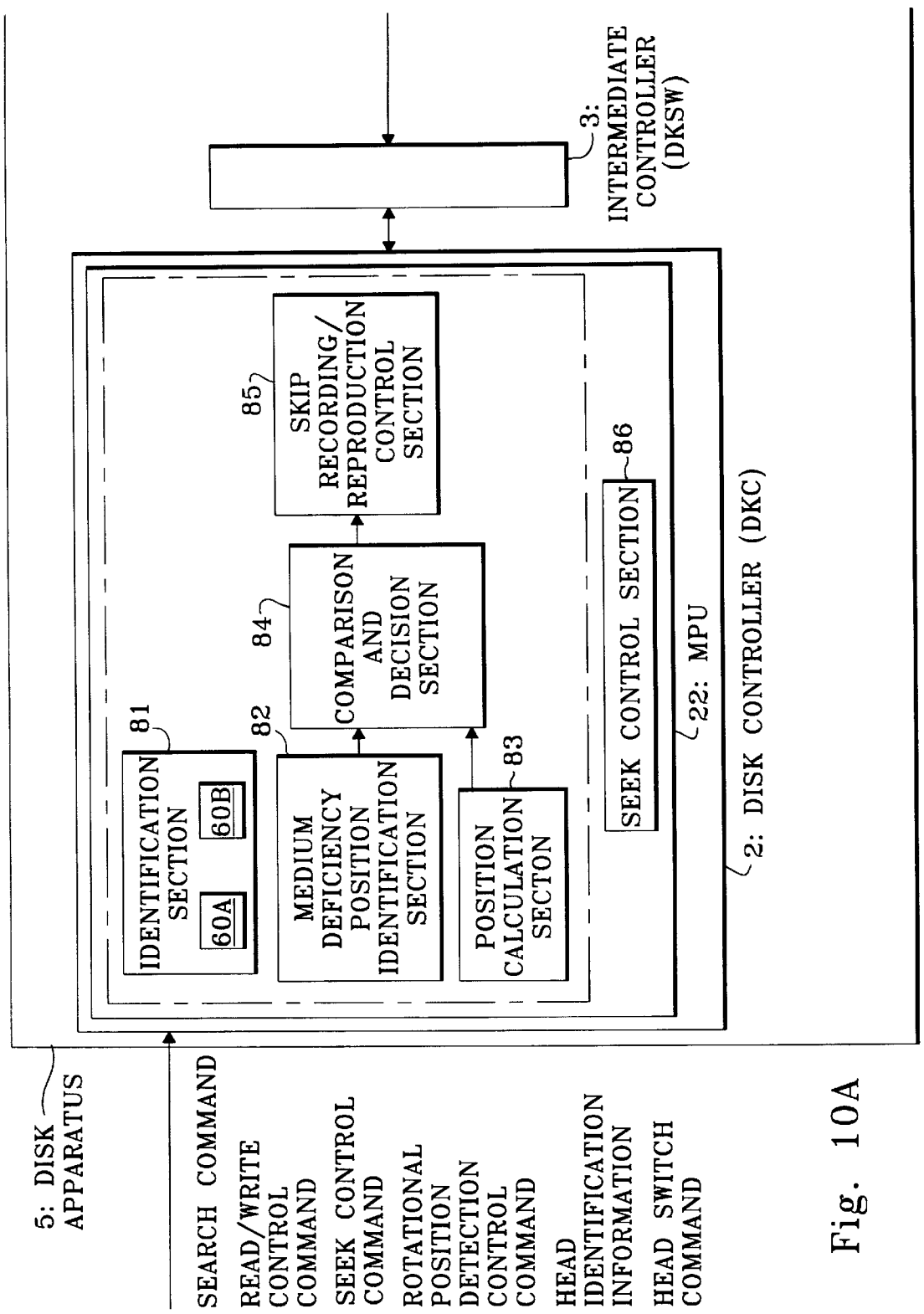
FIG. 10 which is divided into two sections 10A and 10B, is a functional block diagram showing the disk apparatus according to the embodiment of the present invention.
Figure 10B:
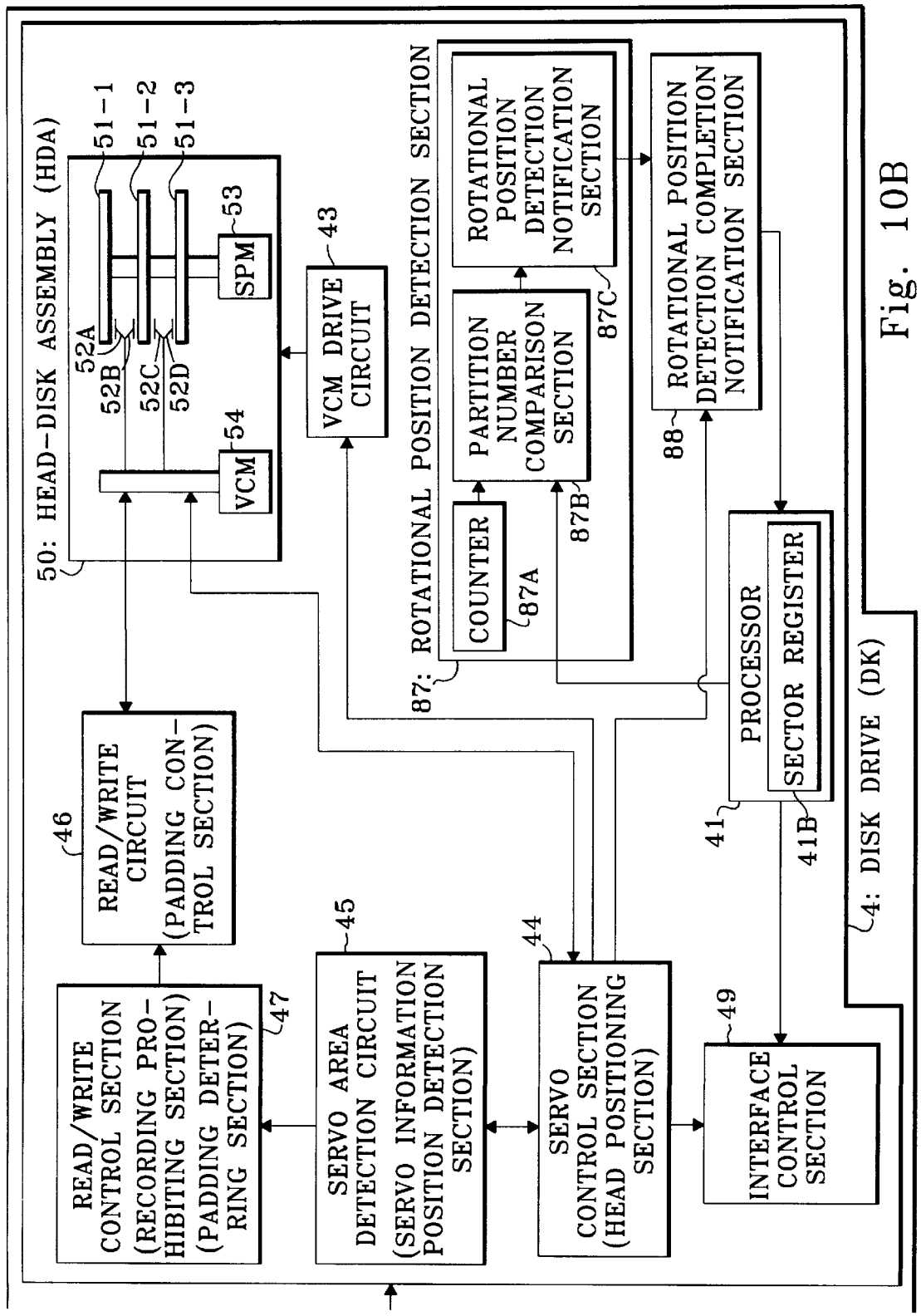

(3) Operation of Disk Apparatus
(3-1) Operation for Avoiding Medium Deficiency and Servo Area FIG. 10 is a block diagram showing the functional configuration of the disk apparatus 5 according to the embodiment of the present invention. As previously described, the disk mediums 51-1 to 51-3 have data planes (the disk surfaces facing the heads 52A to 52C in FIG. 10 are data planes) for recording the head positioning servo information and the record information to be recorded in the record "n". The disk drive 4 records/reproduces the record information via the heads 52A to 52C while driving the disk mediums 51-1 to 51-3. The disk controller (the disk control section) 2 controls the disk drive 4 in accordance with instructions from a higher-level device.

A certain disk medium (e.g., the disk medium 51-3) of all the disk mediums 51-1 to 51-3 of the disk drive 4 is provided with the servo plane. The servo information is recorded over the entire memory area of the servo plane. For example, the disk surface of the disk medium 51-3 that faces the head 52D can be used as the servo plane.

In the disk apparatus 5 according to the embodiment of the present invention, if the data planes of the disk mediums 51-1 to 51-3 have medium deficiencies (the area indicated by X in FIG. 14), the deficient portion and the servo area on the date plane are avoided from recording/reproduction of the data there.

The MPU 22 of the disk controller 2 implements the functions of an identification section 81, a medium deficiency position identification section 82, a position calculation section 83, a comparison and decision section 84, and a skip recording/reproduction control section 85, as shown in FIG. 10, by means of software processing.

The identification section 81 identifies the position on the disk mediums 51-1 to 51-3 where the head positioning servo information is stored. The identification section 81 previously stores the position of the servo information in the table 60B consisting of a memory, as well as reading the position of the servo information from the table 60B. As a result, the position of the servo information can be quickly identified.

The medium deficiency position identification section 82 identifies the positions of deficiencies on the disk mediums 51-1 to 51-3 on the basis of the information recorded on the disk mediums 51-1 and 51-3.

The method for identifying the positions of the deficiencies will now be described.

The disk controller 2 is arranged to receive a command which requests the disk controller 2 to retrieve the home address (HA) or a specific count section (RnC) where the positions of the medium deficiencies are recorded, before receiving a read/write control command from the higher-level device, that is, the CPU 1. Upon receipt of that command, the disk controller 2 retrieves the home address (HA) or the count section ($R_nC$). The position of the medium deficiency is read from the retrieved home address (HA) or count section ($R_nC$) by means of the read/write circuit 46 of the disk drive 4.

The information regarding the position of the medium deficiency is stored in built-in or external memory of the MPU 22. The MPU 22 is arranged to be able to read the information regarding the position of the medium deficiency from the memory and to identify it.

If the allowable number of medium deficiencies in one track is seven, the medium deficiencies are represented by SC0 to SC6. FIG. 14 shows an example where a track has four medium deficiencies SC0 to SC3. The length of these medium deficiencies is, e.g., three or four segments.

The position calculation section 83 identifies the current head position, as well as calculating the position on the disk mediums 51-1 to 51-3 at which record information is to be recorded/reproduced.

The method of identifying the current head position will now be described.

The disk controller 2 is arranged to record/reproduce data after having identified the head position on the track (this operation will be referred to as the establishment of orientation). The head position is identified by executing a search command (i.e., the record retrieve control command) for retrieving the record "n", or by detecting the index marker.

If the head position is identified by executing the search command, the disk controller 2 detects the address mark (AM) in order to retrieve the record number specified by the search command when the search command is sent to the disk controller 2 from the higher-level device, i.e., the CPU.

When the address mark (AM) is detected by executing the search command, the read/write control section 47 and the read/write circuit 46 of the disk drive 4 act as data deterring means for preventing data obtained by reading the head positioning servo information from the data plane, whereby the erroneous detection of the address mark (AM) is prevented.

As a result of the detection of the address mark (AM), the count section ($R_nC$) of the record "n" following the address mark (AM) is read.

The position of the record "n" on the track is recorded in a segment number in the count section ($R_nC$). The disk controller 2 identifies the head position by reading the segment number.

If the head position is identified by detecting the index marker, the home address (HA) following the index marker is read subsequent to the detection of the index marker.

The position of the record "n" on the track is recorded in a segment number in the home address (HA). The disk controller 2 identifies the head position by reading this segment number.

Once the head position has been identified in the above-described manner (i.e., the orientation has been established), each of the commands received from the disk controller 2 is executed in a period which is a predetermined multiple of the time required by the heads 52A to 52C to pass one segment. The position calculation section 83 of the disk controller 2 identifies the current head position by accumulates the number of segments passed by the heads 52A to 52C.

The comparison and decision section 84 compares the position identified by the identification section 81 or the medium deficiency position identification section 82 with the position calculated by the position calculation section 83 each time it receives a predetermined command from the higher-level device. As a result, it is decided whether or not the position identified by the identification section 81 or the medium deficiency position identification section 82 is the position of the record information to be recorded/reproduced.

The skip recording/reproduction control section 85 operates on the basis of the result of the identification made by the comparison and decision section 84. When the position identified by the identification section 81 or the medium deficiency position identification section 82 is the position of the record information to be recorded/reproduced, the skip recording/reproduction section 85 performs control operations such that the position identified by the identification section 81 or the medium deficiency position identification section 82 is skipped to avoid the record information from being recorded and/or reproduced there.

As previously described, the record information comprises data information, key information representing the attribute of the data information, and count information representing the length of the data information. The key information may be omitted from the record information depending on applications.

Since the position identified by the identification section 81 and the medium deficiency position identification section 82 and the position identified and calculated by the position calculation section 61 are made of the segment numbers, the head positioning control is correctly carried out.

If the length of the servo area recorded on the data plane is set so as to be different from the length of the medium deficiency avoidance area for use in avoiding the deficiencies on the disk medium 51-1 to 51-3, the lengths of the servo area and the medium deficiency avoidance area can be respectively set so as to be optimum. If the length of the servo area is set so as to be identical with the length of the medium deficiency avoidance area, a common command can be used both as a command for skipping the servo area and a command for skipping the medium deficiency avoidance area, thereby resulting in simple control operations.

When the servo area and the medium deficiency avoidance area have lengths which are different from each other, a new gap (G5) is used to control the servo area. In contrast, if the servo area and the medium deficiency avoidance area have the same length, it is possible to control the servo area by the gap (G4), which controls the medium deficiency avoidance area.

In the disk apparatus 5 being shown in FIG. 10 and having the previously described configuration according to the embodiment of the present invention, the identification section 81 of the disk controller 2 identifies and reads the position of the servo information from the table 60B in the identification section 81 when the medium deficiency avoiding operation and/or the servo area avoiding operation is performed. The medium deficiency position identification section 82 reads the positions of SC0 to SC6, which are information regarding the medium deficiencies, from the memory and identifies them.

The position calculation section 83 identifies the current head position and calculates the position on the disk mediums 51-1 to 51-3 at which the record information is to be recorded/reproduced.

The comparison and decision section 84 compares the position of the servo information identified by the identification section 81 or the position of the medium deficiency information identified by the medium deficiency position identification section 82 with the positional information calculated by the position calculation section 83, each time the comparison and decision section 84 receives a predetermined command from the higher-level device. It is decided whether or not the position of the servo information or the medium deficiency information is the position of the record information to be recorded/reproduced.

The skip recording/reproduction control section 85 operates based on the result of the decision of the comparison and decision section 84. When the position of the servo information/medium deficiency information and the positional information calculated by the position calculation section 83 agree with each other; namely, the heads 52A to 52C are positioned in the servo area or the medium deficiency avoidance area, the skip recording/reproduction control section 85 sends a command to the disk drive 4 via the intermediate controller 3 so as to instruct the heads to skip the servo area or the medium deficient avoidance area. the heads are controlled in such a way that the position of the servo information (i.e., the servo area) or the position of the deficiency avoidance area is skipped to avoid the record information from being recorded and/or reproduced there. (i.e., the medium deficiency avoidance area).

As a result of the skipping of the servo area or the medium deficiency avoidance area, a movement phenomenon may occur wherein the count section ($R_nC$), the key section ($R_nK$), and the data section ($R_nD$) of the record "n" are shifted in a rearward direction (e.g., $R_3C$ and $R_5C$ are recorded in a rearwardly shifted positions), as shown in FIG. 14. Further, a split phenomenon may occur wherein the key section ($R_nK$) and the data section ($R_nD$) are recorded in a split manner (e.g., $R_1K$ is recorded such that it is divided into $R_1K^1$ and $R_1K^2$, and $R_3D$ is recorded such that it is divided into $R_3D^1$ and $R_3D^2$).

Figure 17:
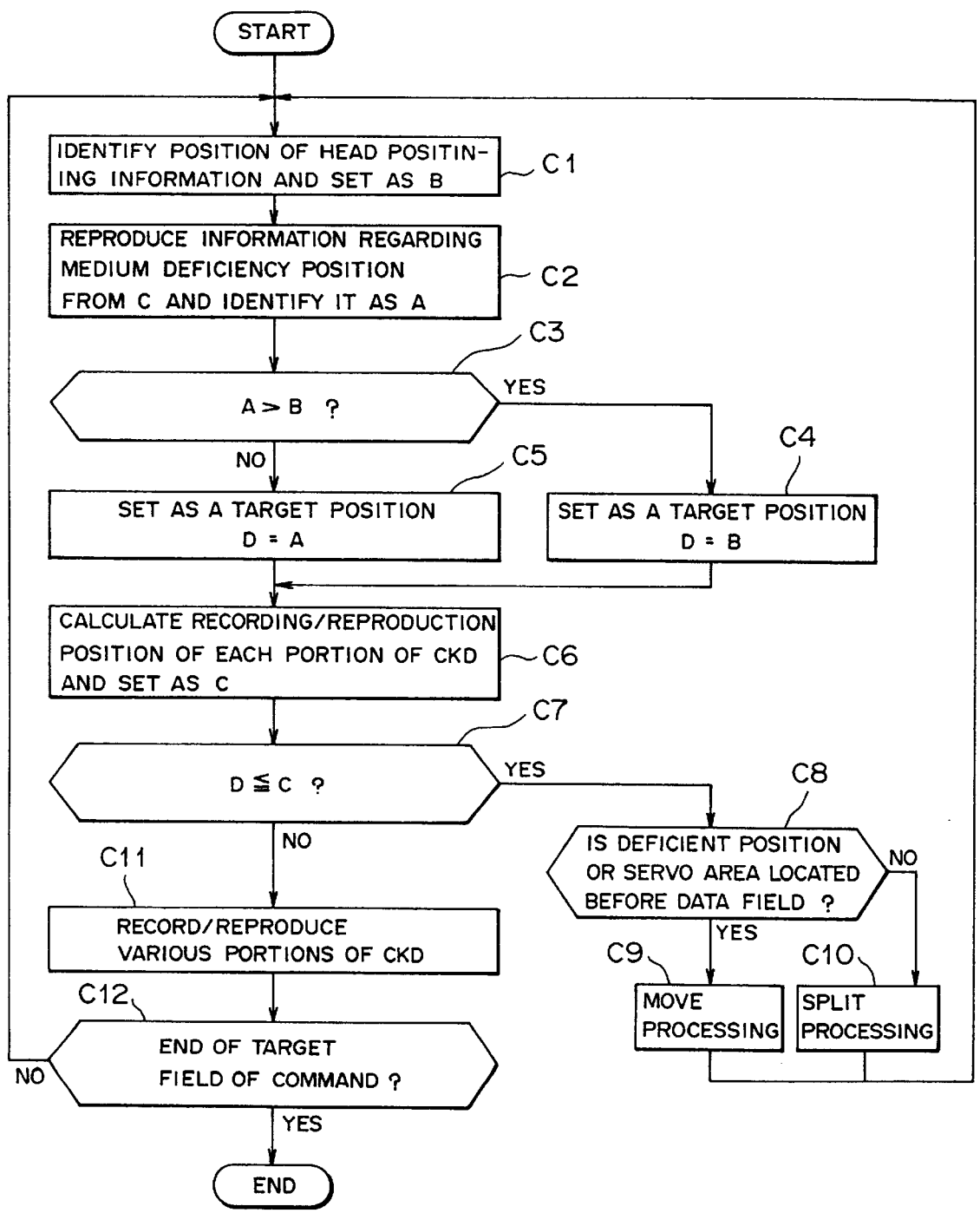
FIG. 17 is a flowchart for explaining the operation of the disk apparatus according to the embodiment of the present invention so as to avoid a deficiency in a recording medium and the servo area.

The previously described avoidance of the medium deficiency and servo area will now be described in detail referring to a flowchart shown in FIG. 17.

The identification section 81 first reads the position of the servo information from the table 60B within the identification section 81, as well as identifying the position of the servo area where the servo information is recorded (assuming that the segment number assigned to the position of the servo area is B) (step C1).

The medium deficiency position identification section 82 reads the medium deficiency position information from the memory, as well as identifying the position of a deficiency (assuming that the segment number assigned to the position of the medium deficiency is A) (step C2).

The comparison and decision section 84 decides whether or not the segment number A is larger than the segment number B by comparing them with each other (step C3).

As indicated by the route YES continued from step C3, if the segment number A is larger than the segment number B, i.e., if the servo area is positioned before the medium deficiency avoidance area, the segment number B is changed to a segment number D that represents the position of an object to be compared (step C4). In contrast, if the segment number A is not larger than the segment number B, as indicated by the route NO continued from step C3, i.e., if the medium deficiency avoidance area is positioned before the servo area, the segment number A is set to the segment number D that represents the position of an object to be compared (step C5).

The position calculation section 83 calculates the position (the segment number assigned to this position is C) of the rear portion of a field following the field in which the count section ($R_nC$), the key section ($R_nK$), and the data section ($R_nD$) are recorded/reproduced (step C6).

Further, the comparison and decision section 84 decides whether or not the segment number D is less than the segment number C by comparing them with each other (step C7).

If the segment number D is less than the segment number C, as indicated by the route YES continued from step C7, i.e., if the current head is situated in the position of the medium deficiency or the servo area, it is decided whether or not the medium deficiency position or the servo area is situated before the data field in which the data section ($R_nD$) is recorded/reproduced (step C8).

If the medium deficiency position or the servo area is situated before the data field, as indicated by the route YES continued from step C8, the movement processing is carried out (step C9). In contrast, if the medium deficient area or the servo area is not situated before the data field, as indicated by the route NO continued from step C8, the split processing is carried out (step C10). The operations following step C1 will be repeated again.

If the segment number D is not less than the segment number C, as indicated by the route NO continued from step C7, i.e., if the current head is not situated in the position of the medium deficiency or the servo area, the disk drive 4 records/reproduces the count section ($R_nC$), the key section ($R_nK$), and the data section ($R_nD$) (step C11). Then, it is decided whether or not the field that is the target of the read/write command for use in recording/reproducing data has been completed (step C12).

If the target field has not been completed yet, as indicated by the route NO continued from step C12, the operations following step C1 will be repeated again. In contrast, if the target field has been completed, as indicated by the route YES continued from step C12, the operation for avoiding the medium deficiencies and servo area will be completed.

According to the present embodiment, even if the disk mediums 51-1 to 51-3 of the sector-servo type disk apparatus 5 that employs the CKD format for handling such variable-length data as shown in FIG. 10 have deficiencies, it becomes possible to record/reproduce data while avoiding the medium deficiencies and the servo area by carrying out the avoidance of the medium deficiency and servo area. Consequently, the storage capacity of the disk apparatus 5 can be effectively utilized.

When the address mark (AM) is detected by execution of the search command, the disk drive 4 prevents the head positioning servo information from being read from the data plane. Consequently, the erroneous detection of the address mark (AM) can be prevented.

The division of the key section ($R_nK$) in order to avoid the servo area makes it possible to carry out the processing similar to the medium deficiency avoiding operation that has been conventionally carried out. In consequence, the disk controller 2 can be simplified, and the working efficiency of the track is improved, which in turn enables higher-density recording of the disk mediums 51-1 to 51-3.

In the present embodiment, the position of the servo information is identified by means of the table 60B. According to the present invention, the identification section 81 may be provided with the function of the position information calculation section 60A that calculates the position of the servo information using the data related to the interval between adjacent servo areas (i.e., using the a calculation expression stored in the memory). The identification section 81 may identify the position of the servo information calculated by the position information calculation section 60A. As a result, the table 60B becomes unnecessary, which contributes to savings in the memory capacity.

Specifically, the servo area exists in the predetermined area (e.g., every 64 segments), and therefore a calculation expression is previously stored in the memory as the data related to the interval between the adjacent servo areas. The position information calculation section 60A calculates the position of the servo information using this calculation expression.

The following expression is used as the calculation expression to be stored in the memory.

$$S = x + y \times N$$

where x: the number of segments corresponding to an offset between the index marker and the servo area S recorded first ("3" in FIG. 14), y: the number of segments between the servo areas ("64" in FIG. 14), and N: integrals such as 0, 1, 2, . . . .

In the above-described embodiment, the position of a medium deficiency and the servo area are both avoided. However, the present invention is not limited thereto, and the control may be modified such that only the servo area is avoided.

Figure 18:
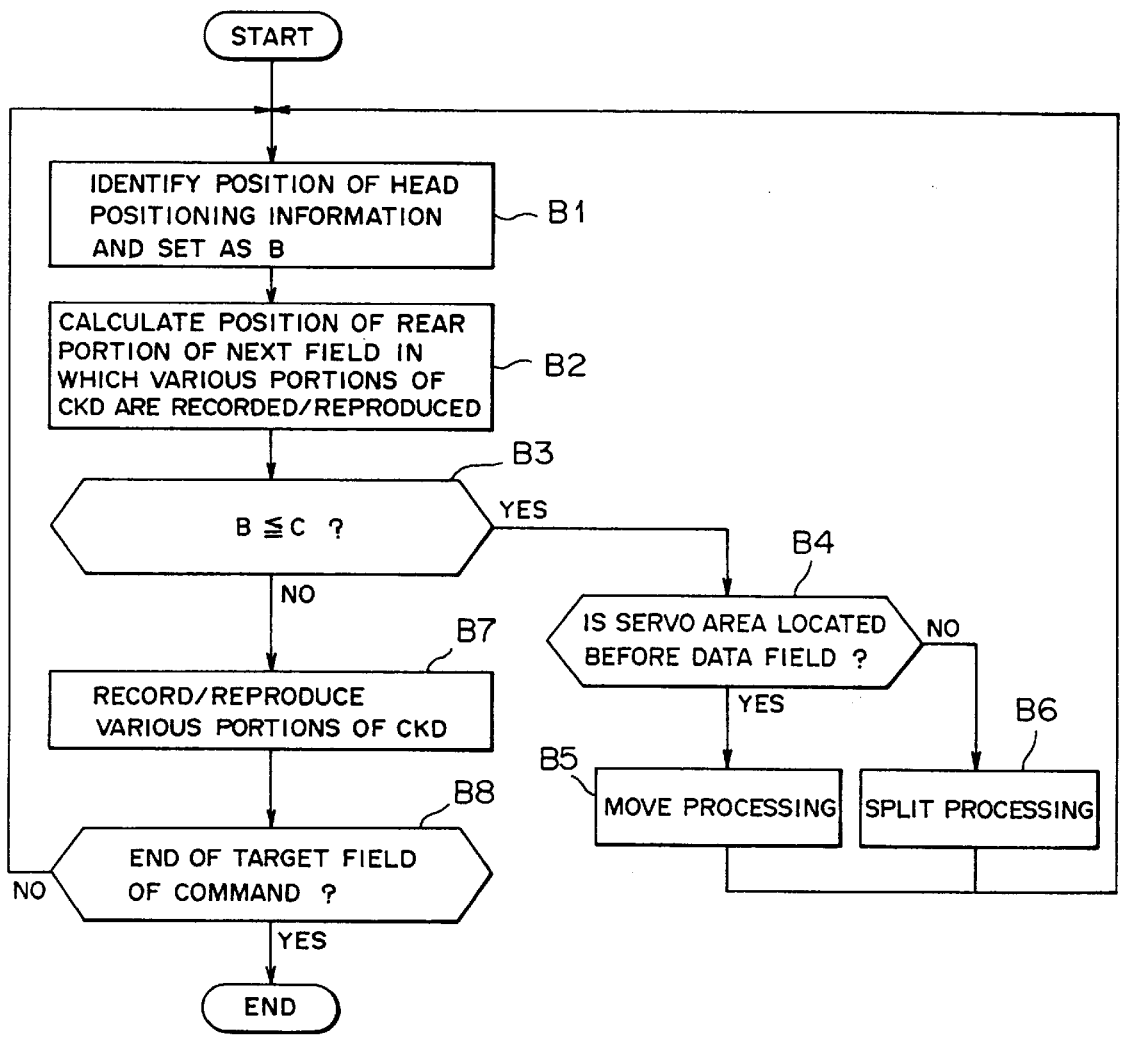
FIG. 18 is a flowchart for explaining the operation of the disk apparatus according to the embodiment of the present invention so as to avoid the servo area.

In this event, the servo area avoidance operation is carried out in the manner as designated by the flowchart shown in FIG. 18.

The identification section 81 first reads the position of the servo information from the table 60B within the identification section 81, as well as identifying the position of the servo area where the servo information is recorded (assuming that the segment number assigned to the position of this servo area is B) (step B1).

The position calculation section 83 calculates the position (assuming that the segment number assigned to this position is C) of the rear portion of a field following the field in which the count section ($R_nC$), the key section ($R_nK$), and the data section ($R_nD$) are recorded/reproduced (step B2).

Further, the comparison and decision section 84 decides whether or not the segment number B is less than the segment number C by comparing them with each other (step B3).

If the segment number B is less than the segment number C, as indicated by the route YES continued from step B3, i.e., if the current head is situated in the servo area, it is decided whether or not the servo area is situated before the data field in which the data section ($R_nD$) is record/reproduced (step B4).

If the servo area is situated before the data field, as indicated by the route YES continued from step B4, the movement processing is carried out (step B5). In contrast, if the servo area is not situated before the data field (i.e., if the servo area is in the middle of the data field), as indicated by the route NO continued from step B4, the split processing is carried out (step B6). The operations following step B1 will be repeated again.

If the segment number B is not equal to or less than the segment number C, as indicated by the route NO continued from step B3, i.e., if the current head is not situated in the servo area, the disk drive 4 records/reproduces the count section ($R_nC$), the key section ($R_nK$), and the data section ($R_nD$) (step B7). Then, it is decided whether or not the field that is the target of the read/write command for use in recording/reproducing data has been completed (step B8).

If the target field has not been completed yet, as indicated by the route NO continued from step B8, the operations following step B1 will be repeated again. In contrast, if the target field has been completed, as indicated by the route YES continued from step B8, the avoidance of the servo area will be completed.

(3-2) Control at Sample-Servo Area

As previously described, the servo area comprises a sample-servo area and a synchronization area, as shown in FIG. 15. If a sample-servo area for use in controlling sector servo positioning operations is erroneously erased, the positioning of the head of the disk apparatus 5 shown in FIG. 10 will not be correctly controlled.

To prevent such erroneous erasure of the sample-servo area, the disk drive 4 shown in FIG. 10 suspends data recording operations irrespective of any control instructions received from a higher-level controller when the heads 52A to 52C have reached the sample-servo area during the recording (writing) of data. The read/write circuit 46 changes itself into a read mode, the servo area detection circuit 45 reads the sample-servo area, and controls the positioning of the heads 52A to 52C. After the heads have passed the sample-servo areas, the read/write circuit 46 is changed to a write mode again, and the data recording operation is carried out again.

The servo area detection circuit 45 converts the servo signal received from the servo control section 44 and outputs the thus converted signal as a servo area signal, as previously described in (1—1).

With the above-described configuration, if the heads 52A to 52C have reached the sample-servo area during the recording of data, it becomes unnecessary for the disk controller 2 to change the read/write circuit 46 from the write mode into the read mode. Accordingly, the control operation associated with the reading of the sample-servo area can be simplified, as well as the erroneous erasure of the sample-servo area can be prevented.

In the disk controller 2, if the comparison and decision section 84 decides that the heads have reached the position of the servo information to be identified by the identification section 81 (i.e., the servo area) while the skip recording/reproduction section 85 is writing the record information, the skip recording/reproduction section 85 may stop the writing operations. As a result, the prevention of the erroneous erasure of the sample-servo area is ensured, which in turn enables further improved reliability of the disk apparatus.

While the servo area detection circuit 45 is reading information from the sample-servo area, a gating operation is performed in order to prevent the information thus read from the sample-servo area from being output as read data by masking the information read from the sample-servo area.

To this end, when the disk drive 4 is controlled by the disk controller 2 so as to read the record information by retrieving the record at high speed, the disk drive 4 does not read the servo information recorded on the data plane.

In consequence, it becomes possible to distinguish the sample-servo area from the address mark (AM) for use in high-speed record retrieval operations, which makes it possible to prevent the erroneous identification of the address mark (AM). So long as the segments and the masking conditions are properly selected and set, it is possible to increase a margin with respect to the erroneous identification.

(3—3) Padding Operation

The disk drive 4 of the disk apparatus 5 according to the embodiment of the present invention is arranged so as to automatically erase the data recorded on the track (i.e., to carry out a padding operation) by writing invalid data into the tracks after a format for use in changing the record configuration of the track has been written.

In the disk apparatus 5 as shown in FIG. 10, the disk drive 4 comprises the read/write circuit 46, the servo area detection circuit 45 having the function of servo information position detection means, and the read/write control section 47 having the function of the padding deterring means.

The read/write circuit 46 (the padding control section) controls the erasure of data by writing invalid data into the tracks in accordance with a format write command, which is one of the read/write control commands received from the disk controller 2.

The servo area detection circuit 45 detects the information regarding the positions on the disk mediums 51-1 to 51-3 where the head positioning servo information is stored. Then, the servo area detection circuit 45 outputs the information as a servo area signal "e" as shown in FIG. 12. In this way, the servo area detection circuit 45 has the function of the servo information position detection means.

The read/write control section 47 operates based on the positional information (i.e., the servo area signal "e") detected at this time so as to prevent the read/write circuit 46 from writing the invalid data at the positions where the head positioning servo information is stored, thereby stopping the operation for data erasure control. In this way, the read/write control section 47 performs the function of the padding deterring means.

In the disk apparatus 5 of the present embodiment according to the invention shown in FIG. 10, when the padding operation is carried out the disk controller 2 outputs the format write command to the intermediate controller 3. Subsequently, the intermediate controller 3 sends a cue pad signal to the disk drive 4 so as to instruct the disk drive 4 to start the padding operation when a write gate signal for use in executing a format writing operation changes itself into an OFF state.

The write gate signal and the cue pad signal are input to the receiving buffer register 49B of the interface control section 49 of the disk drive 4 via the OUT line $L_{out}$ from the sending buffer register 37B of the interface control section 37 of the intermediate controller 3.

When the disk drive 4 receives the cue pad signal after the write gate signal has changed itself into the OFF state, the read/write circuit 46 of the disk drive 4 starts the padding operation to erase the data recorded on the track by writing invalid data into the track.

If the servo area detection circuit 45 detects the servo area during the course of the padding operation, the read/write circuit 46 suspends the writing of invalid data into the servo area under the control of the read/write control section 47. The servo control section 44 then controls the positioning of the heads 52A to 52C.

In other words, if the heads 52A to 52C have reached the servo area during the padding operation, the disk drive 4 suspends the padding operation for erasing data. The read/write circuit 46 is then changed into the read mode, and the positioning of the heads 52A to 52C is controlled by reading the servo area. After the heads have passed the servo area, the read/write circuit 46 is automatically changed into the write mode, and the padding operation is resumed.

This padding operation is repetitively carried out until the heads 52A to 52C reach the index marker.

Because of this, according to the present embodiment, the read/write control section 47 of the disk drive 4 acts as the padding preventing means, and hence the disk drive 4 can prevent the padding operation without receiving control from the disk controller 2. Therefore, the padding operation can be executed without erasing the servo area.

(3-4) Seek Control Operation

In the disk apparatus 5 according to the embodiment of the present invention, it is possible to record/reproduce data or to read the servo information recorded on the servo plane by specifying any one of the heads 52A to 52C and the head 52D after the heads 52A to 52D have been subjected to seek operation. If data are recorded/reproduced or the servo information recorded on the servo plane is read by specifying any one of the heads 52A to 52C and the head 52D immediately after the seek operation has been carried out, the heads 52A to 52C can be positioned on the data plane at higher speed.

In the disk apparatus 5 shown in FIG. 10, the MPU 22 of the disk controller 2 implements the function of a seek control section 86 by means of software processing.

The disk drive 4 is provided with the servo control section 44 that serves as the seek operation section and the VCM drive circuit 43. Further, the disk drive 4 is provided with the servo control section 44 that acts as seek completion notification means, the interface control section 49, and the processor 41.

The seek control section 86 outputs the identification information for identifying the head 52A-52D (e.g., a head number which is modifier data for use in a command sequence) to the disk drive 4 in order to specify the head which is to be subjected to positioning control after the completion of the seek operation (i.e., to specify any one of the heads 52A to 52D).

Consequently, the servo control section 44 receives the seek command and the head identification information from the seek control section 86. The VCM drive circuit 43 performs a seek operation. After the seek operation has been completed, the servo control section 44 controls the positioning of the specified heads 52A to 52C.

In the disk drive 4, if the VCM drive circuit 43 has finished executing the seek operation, and if the servo control section 45 has finished controlling the positioning of the head 52A-52C on the basis of the servo information recorded on the data plane, the interface control section 49 and the processor 41 notify the disk controller 2 of the completion of the processing corresponding to the seek command.

With the above-described configuration, in the disk apparatus according to the embodiment of the present invention shown in FIG. 10, the seek control section 86 of the disk controller 2 outputs information for identifying the head 52A-52D which must be subjected to the seek operation to the disk drive 4 together with the seek command for instruction of the seek operation. As a result, the servo control section 44 of the disk drive 4 receives the seek command and the head identification information from the seek control section 86. Consequently, the VCM drive circuit 43 performs the seek operation. After the completion of the seek operation, the servo control section 44 controls the positioning of the head 52A-52C specified on the basis of the servo information recorded on the data plane.

In this way, after the seek operation carried out by the VCM drive circuit 43 and the positioning of the head 52A-52C carried out by the servo control section 44 have been completed, the interface control section 49 and the processor 41 notify the disk controller 2 of the completion of the processing corresponding to the seek command.

According to the present embodiment, the seek control section 86 of the disk controller 2 outputs the seek command to the disk drive 4, as well as simultaneously outputting the information, which identifies the head 52A-52D. As a result, the positioning of the head 52A-52D can be controlled at higher speed.

After the seeking of the head and the head positioning operation have been completed, the interface control section 49 and the processor 41 of the disk drive 4 notify the disk controller 2 of the completion of the processing corresponding to the seek command, which makes it possible to ensure the recording/reproduction of data.

(3-5) Detection of Rotational Position of Head

The disk apparatus 5 according to the embodiment of the present invention is arranged so as to be able to detect rotational positions of the head.

The detection of rotational positions of the head will now be described.

The disk mediums 51-1 to 51-3 shown in FIG. 10 are made by previously dividing their memory areas into predetermined partitions (sectors) in a circumferential direction. These sectors are assigned sequential numbers (sector values) that start from the index marker. The sector numbers are represented as sector count values that are counted up by a partition counter 87A of a rotational position detection section 87, which will be described later.

The detection of the rotational position is the following operations. Namely, when the rotational position detection command (i.e., a set sector command) is input to the disk drive 4 from the disk controller 2 prior to the recording/reproduction of data, a rotational position (which consists of a segment number) that represents the sector where the target record specified by the rotational position detection command exists is detected.

As previously described, the disk drive 4 controls the positioning of the heads 52A to 52C on the basis of the head positioning servo information recorded on the data plane, as well as detecting a rotational position.

In other words, the positioning of the heads 52A to 52C carried out by the servo control section 44 and the detection of a rotational position carried out by the rotational position detection section 87 are independently carried out.

Further, the disk drive 4 is arranged to specify any one of the heads 52A to 52C upon receipt of the identification information at the same time that the rotational position of the head is detected upon receipt of the rotational position detection command. In consequence, the time required to control the disk controller 2 is reduced, which enables the control of the positioning of the heads 52A to 52C on the data plane to be carried out at higher speed.

As the previously described information for identifying the head 52A-52C by which the rotational position must be detected, a head number can be output to the disk drive 4. The head number is output to the disk drive 4 as the modifier data in the command sequence.

In the disk apparatus 5 shown in FIG. 10, the servo control section (the head positioning section) 44 and the rotational position detection section 87 of the disk drive 4 has the function of a head positioning/rotational position detection section.

The rotational position detection section 87 detects a specified rotational position upon receipt of the rotational position detection command which controls the head so as to detect the specified rotational position. The rotational position detection section 87 comprises the partition counter 87A, a partition number comparison section 87B, and a rotational position detection notification section 87C.

The partition counter 87A is reset when the heads 52A to 52C are situated on the index markers. This partition counter 87A counts up the partition count value in synchronism with the period during which the heads 52A to 52C pass the sector.

The partition number comparison section 87B compares the partition count value received from the partition counter 87A with the partition number specified by the rotational position detection command. The rotational position detection notification section 87C operates on the basis of the result of the comparison received from the partition number comparison section 87B. When the partition count value agrees with the partition number, the rotational position detection notification section 87C notifies the rotational position detection completion notification section 88 of the completion of the detection of the specified rotational position.

The disk controller 2 is irrelevant to the detection of such a rotational position of the head. Consequently, the load exerted on the disk controller 2 is mitigated, which in turn enables high-speed control of the positioning of the heads 52A to 52C over the data plane.

Further, the servo control section 44 positions the heads 52A to 52C on the basis of the head positioning servo information recorded on the corresponding data plane upon receipt of the information for identifying the head 52A-52C whose rotational position must be detected.

The rotational position specified by the rotational position detection command is stored in the sector register 41B of the processor 41, as previously described.

A staggered-index method can be applied to the disk apparatus 5 according to the embodiment of the present invention, wherein the starting position (i.e., the position of the index marker) of the track is different depending on the head number.

In this case, the disk drive 4 has the function of rotational position converter means that converts the rotational position specified by the received identification information (i.e., the head number) of the head 52A-52C into the value corresponding to the identification information (i.e., the head number) of the head 52A-52C. As a result, it is possible to correct the different starting position of the track for each head number, which makes it possible to make the disk apparatus compatible with a general disk apparatus.

Figure 19:
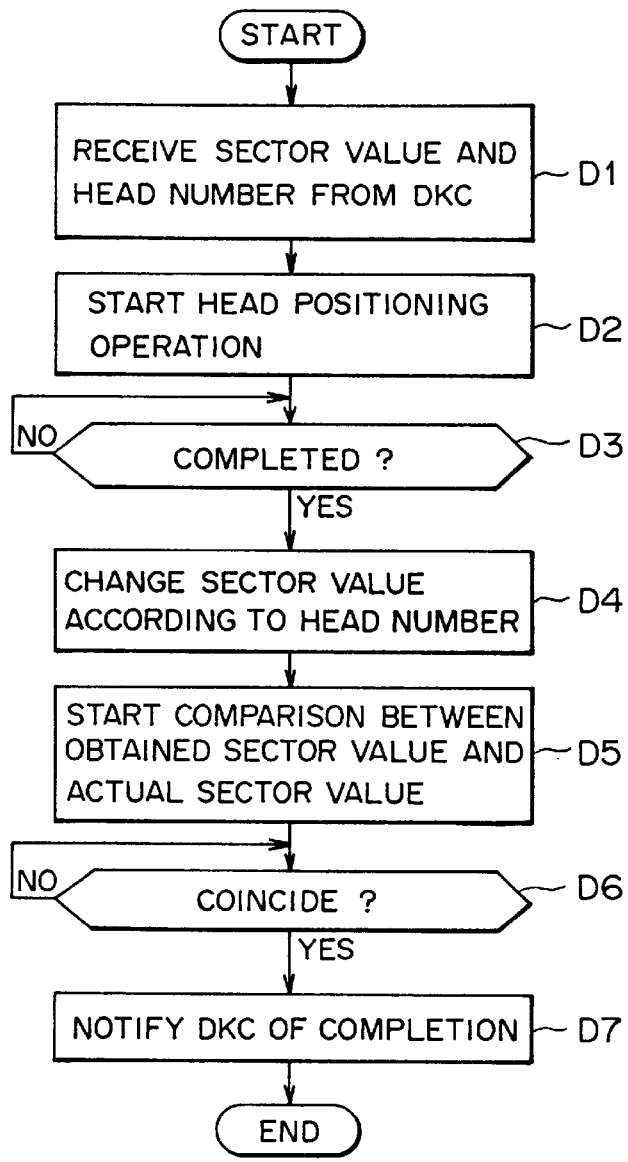
FIG. 19 is a flowchart for explaining the operation of the disk apparatus according to the embodiment of the present invention so as to detect the rotational position of a head.

With reference to a flowchart shown in FIG. 19, the detection of the rotational position of the head of the disk apparatus 5 according to the embodiment of the present invention shown in FIG. 10 will now be described.

The disk drive 4 first receives a sector value from the disk controller 2 as the partition number (i.e., the rotational position) specified by the rotational position detection command and a head number which serves as the head identification information via the intermediate controller 3. The sector value that serves as the partition number specified by the rotational position detection command is stored in the sector register 41B of the processor 41, whereas the head number that serves as the head identification information is input to the servo control section 44 (step D1).

The servo control section 44 that acts as the head positioning section starts the positioning of the head 52A-52C upon receipt of the head number that serves as the head identification information. The positioning control is not carried out until the positioning of the head 52A-52C specified by the head identification information is completed (step D2). After the completion of the positioning of the head 52A-52C, the servo control section 4 notifies the rotational position detection section 88 of the completion of the positioning of the heads 52A to 52C (step D3).

In the disk apparatus 5 that employs the staggered-index method, the servo control section 44 and the rotational position detection section 87, which act as the head position/rotational position detection section, read the sector value as the partition number specified by the rotational position detection command received from the sector register 41B of the processor 41, after the completion of the positioning of the head. The thus-read sector value is converted into a sector value corresponding to the head number, whereby the starting position of the track that is different for each head number is corrected (step D4).

In the rotational position detection section 87, the partition counter 87A counts up an actual sector value as the partition count value. The partition number comparison section 87B inputs the actual sector value that is output from the partition counter 87A and serves as the partition count value and the sector value that was corrected in step D4 and serves as the partition number. The partition number comparison section 87B then compares the actual sector value and the corrected sector value (step D5).

In the disk apparatus that does not employ the staggered-index method, when the positioning operation of the heads 52A-52C has been completed (the route YES continued from step D3), the partition number comparison section 87B of the rotational position detection section 87 compares the sector value that serves as the partition number specified by the rotational position detection command with the actual sector value received from the partition counter 87A (step D5). Accordingly, the operation carried out in step D4 is omitted from the operations of the disk apparatus that does not employ the staggered-index method.

The partition number comparison section 87B notifies the rotational position detection completion notification section 88 of the completion of the detection of the rotational position specified via the rotational position detection notification section 87C when the two sector values agree with each other, irrespective of whether or not the disk apparatus employs the staggered-index method (the route YES continued from step D6).

In this way, upon receipt of the notification of the completion of the positioning of the head 52A-52C and the notification of the completion of the detection of the rotational position, the rotational position detection completion notification section 88 notifies the disk controller 2 of the completion of the processing corresponding to the rotational position detection command via the processor 41 or the like (step D7).

The notification of the completion of the processing corresponding to the rotational position detection command is carried out using a polling sequence after the disk drive 4 has been disconnected from the disk controller 2.

As described above, according to the present embodiment, the disk drive 4 specifies any one of the heads 52A to 52C upon receipt of the information, which identifies the head 52A-52C, as well as the partition number specified by the rotational position detection command, the time required to control the disk controller 2 is reduced, which enables the higher-speed control of the positioning of the head 52A-52C on the data plane.

The rotational position detection completion notification section 88 notifies the disk controller 2 of the completion of the processing corresponding to the rotational position detection command after the positioning of the head 52A-52C and the detection of the rotational position have been completed, which makes it possible to ensure the recording/reproduction of data to a much greater extent.

In the disk apparatus 5 that employs the staggered-index method according to the present embodiment, the sector value of the specified rotational position is converted into the sector value corresponding to the head number, and the starting position of the track that is different for each head number is corrected using the thus-converted sector value. Although the disk drive 4 having such a function has been described in the above embodiment, the disk controller or the intermediate controller may have this function.

(3-6) Head Switching Operation

In the disk apparatus 5 according to the embodiment of the present invention, a head switching operation is carried out so that data can be recorded/reproduced with the head corresponding to each disk medium, when the data are recorded/reproduced using the track of another disk medium after the data has been recorded/reproduced using the track of one disk medium.

After the head switching operation has been carried out, the servo area that is shown in FIG. 14 and is recorded after the index marker representing the starting position of the track is read first. Thereafter, off-track of the head due to thermal off-track or the like is corrected using the thus-obtained servo information after the head switching operation. After the head has been correctly positioned in the track center, the home address (HA) that represents the track address is read.

In the disk mediums 51-1 to 51-3 of the disk apparatus 5 shown in FIG. 10, the index markers representing the starting positions of the plurality of data planes are recorded so as to be shifted by predetermined distances corresponding to the respective data planes (i.e., the distances each of which is an integral multiple of the servo length between one head positioning servo information to the next head positioning servo information).

Figure 16:
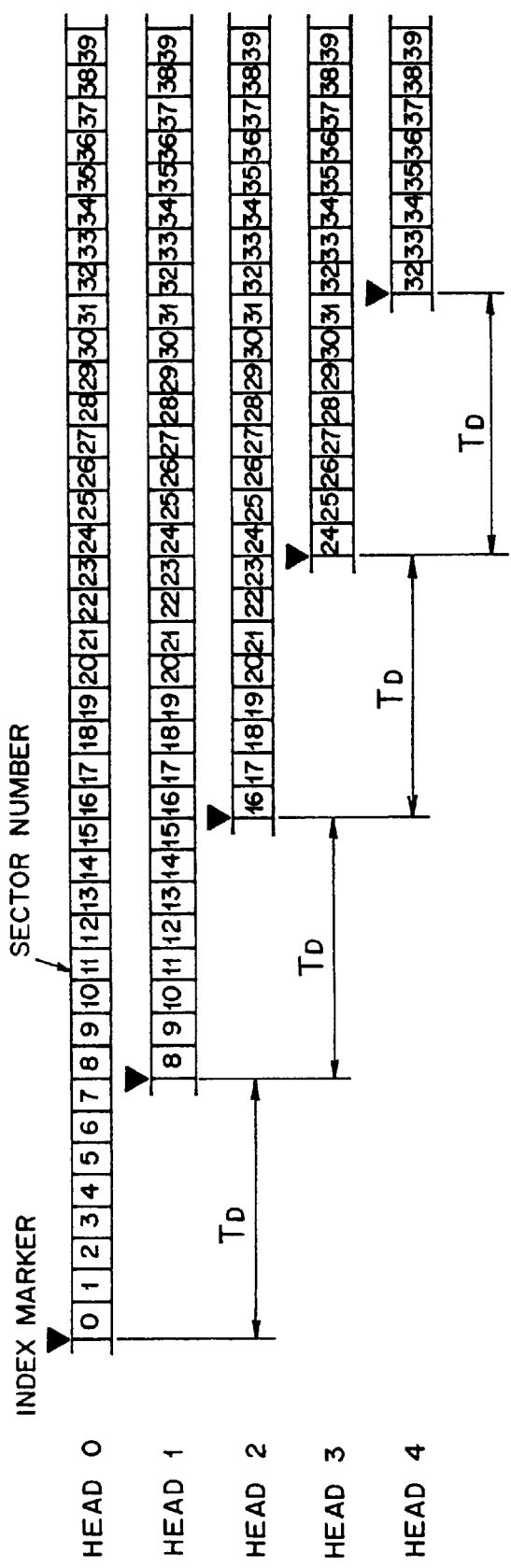
FIG. 16 is a diagram showing index markers which are sequentially delayed by predetermined distances in the embodiment of the present invention.

FIG. 16 shows the index markers that are recorded on the plurality of data planes such that each of them is shifted by a predetermined distance from the preceding one, e.g., a servo length of 8. $T_D$ represents the time required to correct the off-track of the head after the head switching operation.

As a result, it is possible to ensure the time required to switch the head. The index markers and the servo area S as shown in FIG. 14 can be efficiently read corresponding to the switching of the heads 52A to 52C. Even if the amount of the correction of the off-track of the heads 52A to 52C is increased, the home address (HA) can be accurately read.

As a result of the predetermined distance being set to an integral multiple of the servo length, the control operation associated with the head switching operation is simplified, and the accuracy of the control of the positioning of the heads 52A to 52C can be improved.

In the disk mediums 51-1 to 51-3 of the disk apparatus 5 shown in FIG. 10, the servo area where the head positioning servo information is recorded is separated a predetermined distance (e.g., three segments in the case of the track format shown in FIG. 14) from the index marker that represents the starting position of the track, by means of servo write (STW) operations carried out in a factory using a specially designed apparatus.

Consequently, the heads 52A to 52C reach the servo area S immediately after the notification representing that the head positioning control is enabled has been issued as a command sequence after the head switching operation. Therefore, the control of the positioning of the heads 52A to 52C can be quickly completed.

According to the present embodiment, the plurality of index markers are recorded on the respective data planes such that they are delayed by predetermined distances corresponding to the respective data planes in the disk mediums 51-1 to 51-3 of the hybrid type disk apparatus 5. The head positioning servo information is recorded on the data planes so as to be spaced a predetermined distance apart from the index marker. Even if the amount of the correction of the off-track carried out after the head switching operation is large, it is possible to complete the off-track correction of the head before the reading of the home address (HA) as well as to correctly read the home address (HA). Therefore, it is possible to record/reproduce data at high speed.

(3-7) Command Sequence after Head Switching Operation

In the disk apparatus 5 according to the embodiment of the present invention, the disk drive 4 reads a predetermined number of servo areas (e.g., eight areas) recorded on the data plane using the head after the head switching operation has been carried out, whereby the control of the positioning of the head (i.e., on-track control) is carried out. The disk drive 4 notifies the disk controller 2 of the information as to whether or not the data read/write operation is possible in accordance with the number of servo areas passed by the head. As a result, the control of the recording/reproduction of the data is ensured.

The disk drive 4 shown in FIG. 10 notifies the intermediate controller 3 of whether or not the read/write operation is possible, using a machine status in accordance with the number of servo areas passed by the head 52A-52C after the head switching operation has been carried out in response to the head switch command for carrying out switching among the heads 52A to 52C so as to select one of the heads.

Upon receipt of the read/write control command from the disk controller 2, the intermediate controller 3 notifies the disk controller 2 of the read/write enable/disenable information as an answer to the read/write control command on the basis of the machine status received from the disk drive 4.

In this case, for example, a seek/set-sector-interrupt bit is set to 1 as the bit information representing the machine status in order to notify the disk controller 2 of the read/write disenable information. In order to notify the disk controller 2 of the read/write enable information, for example, the seek/set-sector-interrupt bit is set to 0 as the bit information representing the machine status.

That is, if the head 52A-52C has not passed a predetermined number of servo areas yet, the disk drive 4 and the intermediate controller 3 notify the disk controller section 2 of the read/write disenable information. If the head 52A-52C has passed a predetermined number of servo areas, the disk drive 4 and the intermediate controller 3 notify the disk controller 2 of the read/write enable information as the answer to the command.

Next, a description will be given of the case where the head has a large off-track margin (which is the maximum distance between the head and the track center so that the head can record/reproduce data even when it is positioned away from the track center). In this case, when the disk drive 4 has received the read command, it is possible to omit the notification of the read/write enable information to the disk controller 2 so long as the reproduction of data becomes possible as a result of the passage of the predetermined number of servo areas by the head. With this arrangement, the data can be immediately reproduced, which in turn results in considerably improvement in a data reproduction efficiency.

In this case, all that is needed to be done is to notify the disk controller 2 of the read/write enable/disenable information.

(4) Others

In the disk apparatus 5 as shown in FIG. 6, a plurality of intermediate controllers 3 can be connected to the disk controller 2. The disk drives 4-1 to 4-n of the disk apparatus 5 may be connected to the plurality of disk controllers 2 via the intermediate controllers 3; namely, they may be connected in a cross-call configuration. The operation of this configuration will be omitted here, because this configuration can be implemented by the conventional technique.

The processor 39 of the intermediate controller 3 shown in FIG. 8 exchanges control signals with various portions in the intermediate controller 3. The processor 41 of the disk drive 4 exchanges the control signal with various portions in the disk drive 4. The signal lines used for exchange of these control signals are omitted from the drawings for simplicity.

The function of the intermediate controller 3 shown in FIG. 8 is not limited to the previously described function. For example, the VFO 36, the encoder/decoder 35, and the serial-to-parallel converter 34 may be disposed in the disk drive 4.

All of the functions of the intermediate controller 3 may be shifted to the disk drive 4 or the disk controller 2. In contrast, all of the functions of the disk controller 2 may be shifted to the intermediate controller 3 or the disk drive 4.

In the disk apparatus 5 having the servo planes, the position of the sample-servo area shown in FIG. 15 is recorded on the servo plane using the servo signal from which a synch-pulse for PLL synchronization has been removed, which in turn makes it possible to facilitate the configuration of the servo area detection circuit 45 shown in FIG. 9. Simultaneously, the erroneous erasure of the sample-servo area occurred when the disk drive 4 records/reproduces data can be prevented. As a result, the reliability of the disk apparatus 5 can be improved.

A servo area counter may be used in lieu of the servo area detection circuit 45.

Although the above embodiments have been described with reference to the example of hybrid type disk apparatuses, the present invention is not limited thereto. The present invention may be applied to the sector-servo type disk apparatuses that do not have any servo planes.

What is claimed is:

1. A disk apparatus for accessing a disk medium having a data plane on which head positioning information and related record information are stored, comprising: a disk drive for driving the disk medium and recording the information on or reproducing the information from the disk medium, said disk drive having a head via which the information is to be recorded on or reproduced from the disk medium; and a disk control section for controlling said disk drive in accordance with instructions received from a higher-level device, said disk control section including an identification section for identifying information regarding a first position on the disk medium at which said head positioning information is stored, a position calculation section for calculating a second position on the disk medium where recording/reproduction of said related record information is to be performed, a comparison and decision section for comparing the information regarding said first position, which is identified by said identification section, with said second position information, which is calculated by said position calculation section, upon each reception of a predetermined command from said higher-level device and for deciding whether or not said first position identified by said identification section is related to said second position at which said record information is to be recorded or reproduced, and a skip control section for carrying out a control such that when it is judged, on the basis of the result of the comparison made by said comparison and decision section, that said first position identified by said identification section is related to said second position at which recording/reproduction of said record information is to be performed, said first position identified by said identification section is skipped.

2. The disk apparatus according to claim 1, wherein said record information includes data information and count information representing the length of said data information.

3. The disk apparatus according to claim 1, wherein said record information includes data information, key information representing the attribute of said data information, and count information representing the length of said data information.

4. The disk apparatus according to claim 1, wherein the information regarding the position identified by said identification section and the position information calculated by said position calculation section are respectively constructed from segment information.

5. The disk apparatus according to claim 1, wherein said identification section includes a position information calculation section which calculates the information regarding the position by using data regarding an interval between adjacent said head positioning servo information items.

6. The disk apparatus according to claim 1, wherein said identification section includes a table for previously storing the information regarding the position.

7. The disk apparatus according to claim 1, wherein said disk drive further has a position information detection section which detects the information indicating the position on the disk medium at which said head positioning information is stored.

8. The disk apparatus according to claim 7, further comprising a record-inhibiting section which inhibits the recording of said record information on the basis of the detected information received from said position information detection section.

9. The disk apparatus according to claim 1, wherein said disk drive further has a data deterring section for preventing the reading of said head positioning information from said data plane upon reception of a record retrieve control from the higher-level device.

10. The disk apparatus according to claim 1, wherein the length of said head positioning servo information stored in said data plane is set so as to be different from the length of a medium deficiency avoidance area for avoiding a deficiency of said disk medium.

11. The disk apparatus according to claim 1, wherein the length of said head positioning servo information stored in said data plane is set so as to be identical to the length of a medium deficiency avoidance area for avoiding a deficiency of said disk medium.

12. The disk apparatus according to claim 1, wherein said head positioning information recorded on said data plane includes data in a data area which data includes data for use in positioning said head and data in an area following said data area for synchronization.

13. The disk apparatus according to claim 1, wherein said disk drive further includes:
 a padding control section for controlling erasure of data;
 a servo information position detection section for detecting said head positioning information; and
 a padding prevention section for preventing said padding control section from controlling erasure of the position at which said head positioning information is stored, on the basis of the position information detected by said servo information position detection section.

14. The disk apparatus according to claim 1, wherein said disk control section further includes a seek control section that outputs to said disk drive the information for identifying a head to be subjected to a seek operation together with a seek command for controlling said disk drive so as to carry out the seek operation; and
 said disk drive further including a seek operation section that carries out the seek operation upon receipt of the seek command and the head identification information from said seek control section.

15. The disk apparatus according to claim 14, wherein said disk drive comprises a seek completion notifying section which notifies said disk control section that the processing corresponding to the seek command has been completed after said seek operation section has completed the seek operation and after the positioning of said head has been completed on the basis of said head positioning information recorded on said data plane.

16. The disk apparatus according to claim 1, further including a head positioning/rotational position detection section which receives a rotational position detection command for controlling said head so as to detect a specified rotational position and information for identifying said head by which the rotational position is to be detected, and which positions said head and detects the specified rotational position.

17. The disk apparatus according to claim 16, wherein a memory area of said disk medium is divided into a predetermined number of partitions, and the rotational position designated by said rotational position detection command consists of a partition number assigned to a corresponding partition;
 said head positioning/rotational position detection section comprises:
 a head positioning section which positions said heads on the basis of said head positioning information recorded on the corresponding data planes upon receipt of the information, which identifies a head by which rotational position is to be detected; and
 a rotational position detection section which comprises a partition counter which is reset when said head is situated at the starting position on said data plane of said disk medium, and which counts up a partition count value that is synchronous with the period within which said head passes through the partition, a partition number comparison section which compares the partition count value received from said partition counter with the partition number specified by said rotational position detection command, and a rotational position detection notifying section that notifies the higher-level device of the detection of the rotational position when it is judged, on the basis of the result of the comparison made by said partition number comparison section, that the partition count value agrees with the partition number.

18. The disk apparatus according to claim 16, wherein there is further provided a rotational position detection completion notifying section which notifies the higher-level device of completion of processing corresponding to said rotational position detection command after said head positioning/rotational position detection section has detected the rotational position, and after said head has been positioned on the basis of the head positioning information recorded on the data plane.

19. The disk apparatus according to claim 16, wherein there is further provided a rotational position converting section for converting said specified rotational position to a value corresponding to the identification information of said head.

20. The disk apparatus according claim 1, wherein said disk medium further includes a structure in which said head positioning information is spaced a predetermined distance away from a track starting position.

21. The disk apparatus according claim 1, wherein said disk medium further includes a plurality of s data planes for storing head positioning information and record information, said record information including data information and count information regarding the length of the data information, said information being recorded on or reproduced from said disk medium via heads provided for the respective data planes, wherein said disk medium has a structure such that the starting positions of the plurality of data planes are delayed by predetermined distances corresponding to the respective data planes.

22. The disk apparatus according to claim 21, wherein each of said predetermined distances is an integral multiple of the distance between said head positioning information and an adjacent head positioning information.

* * * * *